United States Patent
Nakamura et al.

(10) Patent No.: US 8,852,727 B2
(45) Date of Patent: Oct. 7, 2014

(54) INK COMPOSITION, IMAGE FORMING METHOD, AND PRINTED MATTER

(71) Applicant: FUJIFILM Corporation, Tokyo (JP)

(72) Inventors: Ippei Nakamura, Kanagawa (JP); Koji Hironaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/933,995

(22) Filed: Jul. 2, 2013

(65) Prior Publication Data

US 2013/0295344 A1 Nov. 7, 2013

Related U.S. Application Data

(63) Continuation of application No. PCT/JP2011/080485, filed on Dec. 28, 2011.

(30) Foreign Application Priority Data

Jan. 12, 2011 (JP) ................. 2011-004229

(51) Int. Cl.

| C09D 11/10 | (2014.01) |
| C08J 3/28 | (2006.01) |
| C08K 5/34 | (2006.01) |
| C08K 5/36 | (2006.01) |
| C08K 5/378 | (2006.01) |
| C09D 11/322 | (2014.01) |
| C09D 11/00 | (2014.01) |
| C09D 11/101 | (2014.01) |
| C09D 11/326 | (2014.01) |
| B41J 2/01 | (2006.01) |
| C09D 11/38 | (2014.01) |

(52) U.S. Cl.
CPC .............. *C09D 11/38* (2013.01); *C09D 11/322* (2013.01); *C09D 11/00* (2013.01); *C09D 11/101* (2013.01); *C09D 11/326* (2013.01); *B41J 2/01* (2013.01)
USPC .............. 428/195.1; 524/83; 524/84; 524/86; 524/94; 524/95; 524/104; 524/107; 524/108; 524/111; 524/549; 523/160; 427/487

(58) Field of Classification Search
USPC ........... 524/83, 84, 86, 94, 95, 104, 107, 108, 524/111, 549
See application file for complete search history.

(56) References Cited

U.S. PATENT DOCUMENTS 5,064,747 A * 11/1991 Imai et al. ............... 430/278.1
2002/0028302 A1 3/2002 Okazaki et al.

FOREIGN PATENT DOCUMENTS

| CN | 1330106 A | 1/2002 |
| EP | 0780730 A2 | 6/1997 |
| JP | 09-179290 A | 7/1997 |
| JP | 2005-307199 A | 11/2005 |
| JP | 2009-221281 A | 10/2009 |

OTHER PUBLICATIONS

International Search Report; PCT/JP2011/080485; Feb. 7, 2012.
Written Opinion of the International Searching Authority; PCT/JP2011/080485; Feb. 7, 2012.
The first Office Action issued by the State Intellectual Property Office of People's Republic of China on Jun. 5, 2014, which corresponds to Chinese Patent Application No. 201180064751.4 and is related to U.S. Appl. No. 13/933,995; with English language partial translation.

* cited by examiner

*Primary Examiner* — Vu A Nguyen
(74) *Attorney, Agent, or Firm* — Studebaker & Brackett PC

(57) ABSTRACT

The present invention provides an ink composition including (Component A) a compound having two or more groups represented by Structural Formula (1), (Component B) a compound represented by Formula (2), (Component C) a coloring material, and (Component D) water: wherein in Structural Formula (1), $R^a$ and $R^b$ represent alkyl groups, and $R^a$ and $R^b$ may be bonded to each other to form a ring; and in Formula (2), $R^{b1}$ and $R^{b2}$ each represent a hydrogen atom, an alkyl group, an aryl group, or the like; $Y^{b1}$ and $Y^{b2}$ each represent —O—, —S—, —$NR^{b3}$—, or the like; $G^{b1}$ and $G^{b2}$ each represent a hydrogen atom, a cyano group, an amide group, or the like; $R^{b1}$ and $R^{b2}$, and $G^{b1}$ and $G^{b2}$ may be respectively bonded to each other to form a ring; and at least one of $R^{b1}$, $R^{b2}$, $Y^{b1}$, $Y^{b2}$, $G^{b1}$ and $G^{b2}$ is substituted with a hydrophilic group.

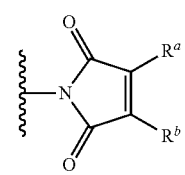

(1)

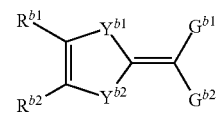

(2)

11 Claims, No Drawings

INK COMPOSITION, IMAGE FORMING METHOD, AND PRINTED MATTER

CROSS-REFERENCE TO RELATED APPLICATIONS

This application is a continuation application of International Application No. PCT/JP/2011/080485, filed Dec. 28, 2011, the disclosure of which is incorporated herein by reference in its entirety. Further, this application claims priority from Japanese Patent Application No. 2011-004229, filed Jan. 12, 2011, the disclosure of which is incorporated herein by reference in its entirety.

TECHNICAL FIELD

The present invention relates to an ink composition, an image forming method, and printed matter.

BACKGROUND ART

Examples of image recording methods by which an image is formed on recording media such as paper based on an image data signal include an electrophotography system, sublimation type and fusion type thermal transfer systems, and an inkjet system. An electrophotography system requires a process for forming an electrostatic latent image on a photoreceptor drum by charging and exposure, as a result of which the system is complex and there are problems of high production costs and the like. Furthermore, in a thermal transfer system, although the apparatus are inexpensive, there are problems of high running costs and waste materials being produced, due to the use of ink ribbons.

In contrast, in an inkjet system, image formation is performed directly onto a recording medium by ejecting an ink only onto an image part where needed, by using an inexpensive apparatus, whereby the system has the advantages that ink can be used with high efficiency and running costs are low. Furthermore, the system produces less noise, and is excellent as an image recording system.

Among ink compositions that are used in the recording of images by an inkjet system, an active energy ray-curable aqueous ink can be suitably used in the printing of an image, in pretreatment for imparting printability to recording media, in post-treatment for protection/decoration of a printed image, and the like. Furthermore, since the active energy ray-curable aqueous ink contains water as a main component, the ink is highly safe and has low viscosity, as a result of which the ink can also be applied to a high density inkjet recording process. As such, the inkjet system is a technology having many excellent features and high potential.

Examples of an active energy ray-curable ink composition include those described in Japanese Patent Application Laid-Open (JP-A) No. 2005-307199 and JP-A No. 2005-307199 in which ink compositions for inkjet recording are described that produce a film having excellent adhesiveness and the like when irradiated with light.

SUMMARY OF INVENTION

Technical Problem

However, in regard to JP-A No. 2005-307199, which discloses a technique using a photopolymerization initiator, there is a risk of exerting an adverse effect on the film properties or printed matter since a decomposition product of a photopolymerization initiator that has been added or an unreacted residual material remains on the cured film. Therefore, there are cases in which a sufficient amount of a photopolymerization initiator cannot be used. Therefore, there is still room for improvement in the adhesiveness or solvent resistance of a printed image. Furthermore, when an LED is used as a light source for curing the ink composition, there are problems of insufficient adhesiveness and/or solvent resistance of an image being obtained or the like since the curing reaction of the ink composition occurs insufficiently depending on the wavelength region of the LED. In addition, there is also room for further improvement in terms of the ejectability and storage stability of the ink composition.

Therefore, there is high demand for an ink composition with ejectability and storage stability, which has excellent adhesiveness and solvent resistance of an image recorded by exposure to an LED.

In view of the above-described circumstances, an object of the present invention is to provide an ink composition that has excellent ejectability when an image is recorded by an inkjet method, that provides an image that is recorded by exposure to an LED having excellent solvent resistance and adhesiveness to a base material, and that has excellent storage stability of the ink composition.

Solution to Problem

Specific means for addressing the above-described issues are as follows.

<1> An ink composition, comprising: (Component A) a compound having two or more groups each represented by Structural Formula (1); (Component B) a compound represented by Formula (2); (Component C) a coloring material; and (Component D) water:

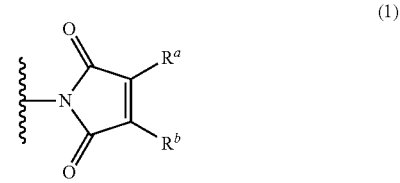

wherein, in Structural Formula (1), $R^a$ and $R^b$ each independently represent an alkyl group having 1 to 4 carbon atoms, and $R^a$ and $R^b$ may be bonded to each other to form a 4-membered to 6-membered ring; and

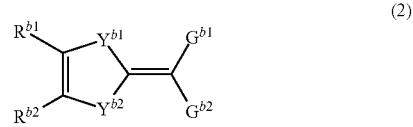

wherein, in Formula (2), $R^{b1}$ and $R^{b2}$ each independently represent a hydrogen atom, an alkyl group, an aryl group, an alkenyl group, or a residue obtained by eliminating one hydrogen atom from a heterocyclic compound, and $R^{b1}$ and $R^{b2}$ may be bonded to each other to form a ring;

$Y^{b1}$ and $Y^{b2}$ each independently represent a divalent group selected from the group consisting of —O—, —S—, —NR$^{b3}$—, —Se—, —C(CH$_3$)$_2$—, and —CH=CH—, wherein $R^{b3}$ represents a hydrogen atom, an alkyl group, an aryl group, or an alkenyl group;

$G^{b1}$ and $G^{b2}$ each independently represent a hydrogen atom, a cyano group, an amide group, an alkoxycarbonyl group, an aryloxycarbonyl group, an acyl group, an arylcarbonyl group, an alkylsulfanyl group, an arylsulfanyl group, an alkylsulfonyl group, an arylsulfonyl group, or a fluoroalkylsulfonyl group, and $G^{b1}$ and $G^{b2}$ may be bonded to each other to form a ring, provided that when $G^{b1}$ and $G^{b2}$ form a ring, the ring may contain, in the ring, a divalent linking group selected from the group consisting of —C(=O)—, —C(=S)—, —$NR^{12}$—, —N=$CR^{13}$—, —O—, and —S—, wherein $R^{12}$ represents a hydrogen atom, an alkyl group, or an aryl group and $R^{13}$ represents a hydrogen atom, an alkyl group, or an aryl group; and at least one of $R^{b1}, R^{b2}, Y^{b1}, Y^{b2}, G^{b1}$ and $G^{b2}$ is substituted with at least one hydrophilic group.

<2> The ink composition according to <1>, wherein the compound represented by Formula (2) is a compound represented by the following Formula (2-a)

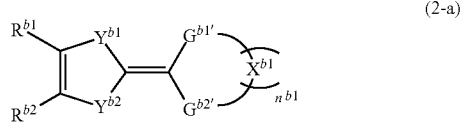

(2-a)

wherein, in Formula (2-a), $G^{b1'}$ and $G^{b2'}$ each represent a residue obtained by eliminating one hydrogen atom from $G^{b1}$ and $G^{b2}$ in Formula (2); $X^{b1}$ represents a single bond, —C(=O)—, —C(=S)—, —$NR^{12}$—, —N=$CR^{13}$—, —O—, or —S—, wherein $R^{12}$ represents a hydrogen atom, an alkyl group, or an aryl group and $R^{13}$ represents a hydrogen atom, an alkyl group, or an aryl group, while a plurality of $X^{b1}$'s may be identical to or different from each other; and $n^{b1}$ represents an integer of 1 or greater;

$R^{b1}$ and $R^{b2}$ each independently represent a hydrogen atom, an alkyl group, an aryl group, an alkenyl group, or a residue obtained by eliminating one hydrogen atom from a heterocyclic compound, and $R^{b1}$ and $R^{b2}$ may be bonded to each other to form a ring; and $Y^{b1}$ and $Y^{b2}$ each independently represent —O—, —S—, - or —$NR^{b3}$—, wherein $R^{b3}$ represents a hydrogen atom, an alkyl group, an aryl group, or an alkenyl group; and at least one of $R^{b1}$, $R^{b2}$, $Y^{b1}$, $Y^{b2}$, $G^{b1'}$, $G^{b2'}$ and $X^{b1}$ is substituted with at least one hydrophilic group.

<3> The ink composition according to <1>, wherein the compound represented by Formula (2) is a compound represented by the following Formula (2-b):

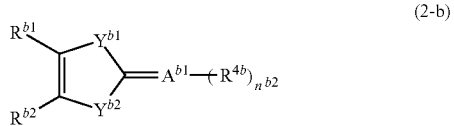

(2-b)

wherein, in Formula (2-b), $A^{b1}$ represents a residue obtained by eliminating $(2+n^{b2})$ hydrogen atoms from a compound having a hydrocarbon ring or a compound having a heterocyclic ring; $R^{4b}$ represents a hydrogen atom, an alkyl group, or an aryl group, and when there are plural $R^{4b'}$s, each $R^{4b}$ may be identical to or different from another $R^{4b}$; $n^{b2}$ represents an integer of 0 or greater, provided that the double bond linking $A^{b1}$ and the 5-membered ring in Formula (2-b) is bonded to a carbon atom in $A^{b1}$; and at least one of $R^{b1}, R^{b2}, Y^{b1}, Y^{b2}, A^{b1}$, and $R^{4b}$ is substituted with at least one hydrophilic group.

<4> The ink composition according to any one of <1> to <3>, wherein the compound represented by Formula (2) is a compound represented by the following Formula (2-c):

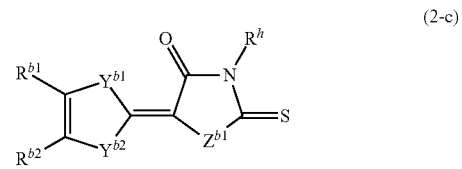

(2-c)

wherein, in Formula (2-c), $Z^{b1}$ represents —$CONR^i$—, —$NR^i$—, —O—, or —S—; $R^i$ represents a hydrogen atom, an alkyl group, or an aryl group; $R^h$ represents a hydrogen atom, an alkyl group, or an aryl group; $R^{b1}$ and $R^{b2}$ each independently represent a hydrogen atom, an alkyl group, an aryl group, an alkenyl group, or a residue obtained by eliminating one hydrogen atom from a heterocyclic compound, and $R^{b1}$ and $R^{b2}$ may be bonded to each other to form a ring; and $Y^{b1}$ and $Y^{b2}$ each independently represent —O—, —S—, or —$NR^{b3}$—, wherein $R^{b3}$ represents a hydrogen atom, an alkyl group, an aryl group, or an alkenyl group; and at least one of $R^{b1}, R^{b2}, Y^{b1}, Y^{b2}, Z^{b1}$, and $R^h$ is substituted with at least one hydrophilic group.

<5> The ink composition according to any one of <1> to <4>, wherein the hydrophilic group is at least one group selected from the group consisting of —COOH, —$NHSO_2R^4$, —$CONHCOR^4$, and —$CONHSO_2R^4$, wherein $R^4$ represents an alkyl group, an aryl group, or an aralkyl group, or a salt thereof.

<6> The ink composition according to any one of <1> to <5>, wherein the (Component A) compound having two or more groups represented by Structural Formula (1) is a polymer compound having a group represented by Structural Formula (1) in a side chain thereof.

<7> The ink composition according to <6>, wherein a weight average molecular weight of the polymer compound having a group represented by Structural Formula (1) in a side chain thereof is 5,000 to 200,000.

<8> The ink composition according to any one of <1> to <7>, wherein a content of the (Component D) water in the ink composition is from 10% to 97% by mass.

<9> The ink composition according to any one of <1> to <8>, further comprising (Component E) a water-soluble organic solvent.

<10> An image forming method comprising: an ink application process of applying the ink composition according to any one of <1> to <9> onto a recording medium; and an irradiation process of irradiating the ink composition with an active energy ray.

<11> Printed matter recorded according to the image forming method according to <10>.

Advantageous Effects of Invention

According to the present invention, an ink composition which has excellent ejectability when images are recorded by an inkjet method, gives an image that is recorded by exposure to an LED and has excellent solvent resistance and adhesiveness to a base material, and also has excellent storage stability of the ink composition, can be provided.

DESCRIPTION OF EMBODIMENTS

Ink Composition

The ink composition contains (Component A) a compound having two or more groups each represented by Structural Formula (1), (Component B) a compound represented by Formula (2), (Component C) a coloring material, and (Component D) water.

In the present specification, the term "~(to)" is used to mean that the numerical values described before and after the term are included as the lower limit value and the upper limit value.

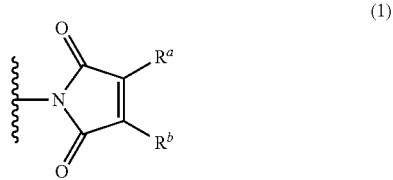

In Structural Formula (1), $R^a$ and $R^b$ each independently represent an alkyl group having 1 to 4 carbon atoms, and $R^a$ and $R^b$ may be bonded to each other to form a 4-membered to 6-membered ring.

The undulating line in Structural Formula (1) represents the bonding position in the Component A. Hereinafter, the undulating line in Structural Formula (1) has the same definition throughout the specification.

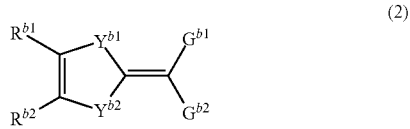

In Formula (2), $R^{b1}$ and $R^{b2}$ each independently represent a hydrogen atom, an alkyl group, an aryl group, an alkenyl group, or a residue obtained by eliminating one hydrogen atom from a heterocyclic compound, while $R^{b1}$ and $R^{b2}$ may also be bonded to each other to form a ring;

$Y^{b1}$ and $Y^{b2}$ each independently represent a divalent group selected from the group consisting of —O—, —S—, —NR$^{b3}$— (wherein R$^{b3}$ represents a hydrogen atom, an alkyl group, an aryl group, or an alkenyl group), —Se—, —C(CH$_3$)$_2$—, and —CH=CH—;

$G^{b1}$ and $G^{b2}$ each independently represent a hydrogen atom, a cyano group, an amide group, an alkoxycarbonyl group, an aryloxycarbonyl group, an acyl group, an arylcarbonyl group, an alkylsulfanyl group, an arylsulfanyl group, an alkylsulfonyl group, an arylsulfonyl group, or a fluoroalkylsulfonyl group, and $G^{b1}$ and $G^{b2}$ may also be bonded to each other to form a ring; when $G^{b1}$ and $G^{b2}$ form a ring, the ring may contain, in the ring, a divalent linking group selected from the group consisting of —C(=O)—, —C(=S)—, —NR$^{12}$— (wherein R$^{12}$ represents a hydrogen atom, an alkyl group, or an aryl group), —N=CR$^{13}$— (wherein R$^{13}$ represents a hydrogen atom, an alkyl group, or an aryl group), —O— and —S—; and at least one of $R^{b1}$, $R^{b2}$, $Y^{b1}$, $Y^{b2}$, $G^{b1}$, and $G^{b2}$ is substituted with at least one hydrophilic group.

The inventors of the present invention have found that when a particular compound having two or more groups each represented by Structural Formula (1), a particular compound having a structure represented by Formula (2), a coloring material, and water are used in an ink composition, effects of excellent ejectability when images are recorded by an inkjet method, excellent solvent resistance and adhesiveness to a base material of images recorded by exposure to an LED, and excellent storage stability of the ink composition, are obtained. Although the mechanism of the invention is not clear, the inventors speculate as follows. In the invention, it is considered that when a particular compound having a structure of Formula (2) is used, as the absorption efficiency in the case of using LED light as an exposure light source is increased, photoreactivity is enhanced, and images having excellent solvent resistance or adhesiveness to a base material can be formed. Furthermore, it is believed that due to the compatibility of the particular compound having a structure of Structural Formula (1) and the particular compound having a structure of Formula (2), and to excellent solubility in an aqueous medium containing water as a constituent component, satisfactory storage stability and ejection stability can be achieved.

Hereinafter, the ink composition of the invention is described in detail.

<(Component A) Compound Having Two or More Groups Each Represented by Structural Formula (1)>

In regard to the compound having two or more groups each represented by the following Structural Formula (1) used in the invention, any compound having two or more groups each represented by Structural Formula (1) can be used without any limitations. Furthermore, when a compound having two or more groups each represented by Structural Formula (1) is used, a crosslinking reaction of the ink composition can be carried out without separately using a monomer as described below.

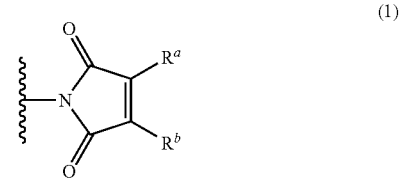

In Structural Formula (1), $R^a$ and $R^b$ each independently represent an alkyl group having 1 to 4 carbon atoms, and $R^a$ and $R^b$ may be bonded to each other to form a 4-membered to 6-membered ring.

In Structural Formula (1), $R^a$ and $R^b$ may have a substituent or may have no substituent, but preferably do not have a substituent.

$R^a$ and $R^b$ each independently represent an alkyl group having 1 to 4 carbon atoms, and may have a straight chain structure or a branched structure. Specific examples include a methyl group, an ethyl group, a propyl group, an isopropyl group, a butyl group, an isobutyl group, a sec-butyl group, or a t-butyl group. $R^a$ and $R^b$ may be bonded to each other to form a 4-membered to 6-membered ring.

From the viewpoint of the film properties of an ink cured film such as solvent resistance and adhesiveness to a base material after the ink composition is cured, $R^a$ and $R^b$ are each independently preferably an alkyl group having 1 to 2 carbon atoms, that is, a methyl group or an ethyl group, and particularly preferably a methyl group. Furthermore, when $R^a$ and $R^b$ are bonded to each other to form a 4-membered to 6-membered ring, the ring is preferably a 5-membered or 6-membered ring, and more preferably a 6-membered ring. Furthermore, when $R^a$ and $R^b$ are bonded to each other to form a 4-membered to 6-membered ring, the ring preferably has an alicyclic structure.

(Component A) in the invention is preferably water-soluble or water-dispersible. It is preferable that 1 g of (Component A) can be dissolved or dispersed in less than 30 ml of water; it is more preferable that 1 g of (Component A) can be dissolved or dispersed in less than 20 ml of water; and it is particularly preferable that 1 g of (Component A) can be dissolved or dispersed in less than 10 ml of water. From the viewpoint of further enhancing the effects of the invention, (Component A) preferably has a water-soluble group.

The water-soluble group which (Component A) may have is not limited as long as it is a group capable of imparting water-solubility or water-dispersibility to the compound of (Component A). The water-soluble group which (Component A) may have is preferably a group selected from the group consisting of a salt of a carboxyl group, a salt of a sulfo group, a phosphoric acid group, a salt of a phosphoric acid group, a phosphonic acid group, a salt of a phosphonic acid group, and a quaternary ammonium salt. Examples of the salt include a metal salt and an onium salt.

The water-soluble group which (Component A) may have is more preferably a group selected from the group consisting of a salt of a carboxyl group, a salt of a sulfo group, a phosphoric acid group, a salt of a phosphoric acid group, a phosphonic acid group, and a salt of a phosphonic acid group; particularly preferably a group selected from the group consisting of a salt of a carboxyl group and a salt of a sulfo group; and most preferably a salt of a carboxyl group.

The metal salt of a carboxyl group is preferably an alkali metal salt of a carboxyl group. Specific examples thereof include —COOLi, —COONa, and —COOK, and preferable examples include —COONa and —COOK.

Examples of the onium salt of a carboxyl group include an ammonium salt, a pyridinium salt, and a phosphonium salt of a carboxyl group, and an ammonium salt is preferable. Specific examples thereof include a tetraalkylammonium salt of a carboxyl group and a trialkylarylammonium salt of a carboxyl group, and a tetraalkylammonium salt of a carboxyl group is preferable. The alkyl group that forms an ammonium salt is preferably an alkyl group having 1 to 4 carbon atoms, and the aryl group is preferably a phenyl group.

The metal salt of a sulfo group is preferably an alkali metal salt of a sulfo group. Specific examples thereof include —$SO_3$Li, —$SO_3$Na, and —$SO_3$K, and preferable examples include —$SO_3$Na and —$SO_3$K.

Examples of the onium salt of a sulfo group include an ammonium salt, a pyridinium salt, and a phosphonium salt of a sulfo group, and an ammonium salt is preferable. Specific examples thereof include a tetraalkylammonium salt of a sulfo group and a trialkylarylammonium salt of a sulfo group, and a tetraalkylammonium salt of a sulfo group is preferable. The alkyl group that forms an ammonium salt is preferably an alkyl group having 1 to 4 carbon atoms, and the aryl group is preferably a phenyl group.

The metal salt of a phosphoric acid group is preferably an alkali metal salt of a phosphoric acid group. Specific examples thereof include a sodium salt or a potassium salt of a phosphoric acid group, and a sodium salt of a phosphoric acid group is preferable.

Examples of the onium salt of a phosphoric acid group include an ammonium salt, a pyridinium salt, and a phosphonium salt of a phosphoric acid group, and an ammonium salt is preferable. Specific examples thereof include a tetraalkylammonium salt of a phosphoric acid group and a trialkylarylammonium salt of a phosphoric acid group, and a tetraalkylammonium salt of a phosphoric acid group is preferable. The alkyl group that forms an ammonium salt is preferably an alkyl group having 1 to 4 carbon atoms, and the aryl group is preferably a phenyl group.

The metal salt of a phosphonic acid group is preferably an alkali metal salt of a phosphonic acid group. Specific examples thereof include a sodium salt and a potassium salt of a phosphonic acid group, and a sodium salt of a phosphonic acid group is preferable.

Examples of the onium salt of a phosphonic acid group include an ammonium salt, a pyridinium salt, and a phosphonium salt of a phosphonic acid group, and an ammonium salt is preferable. Specific examples thereof include a tetraalkylammonium salt of a phosphonic acid group and a trialkylarylammonium salt of a phosphonic acid group, and a tetraalkylammonium salt of a phosphonic acid group is preferable. The alkyl group that forms the ammonium salt is preferably an alkyl group having 1 to 4 carbon atoms, and the aryl group is preferably a phenyl group.

Examples of the quaternary ammonium salt include a salt formed from a quaternary ammonium ion and a halide ion; a salt formed from a quaternary ammonium ion and an organic anion such as a sulfonic acid ion, a phosphoric acid ion or a phosphonic acid ion; and a salt formed from a quaternary ammonium ion and an anion containing a fluorine atom, such as $BF_4^-$, $PF_6^-$ or $SbF_6^-$. The quaternary ammonium salt is preferably a salt formed from a quaternary ammonium ion and a halide ion.

The quaternary ammonium ion is preferably one having a trialkylammonium structure, and the alkyl group preferably has 1 to 10 carbon atoms, and more preferably has 1 to 5 carbon atoms. Specifically, a quaternary ammonium ion preferably has a trimethylammonium structure or a triethylammonium structure.

Specific examples of the quaternary ammonium salt include —$N^+(CH_3)_3Cl^-$, —$N^+(C_2H_5)_3Cl^-$, and —$N^+(C_4H_9)_3Cl^-$, and —$N^+(CH_3)_3Cl^-$, —$N^+(C_2H_5)_3Cl^-$, and the like are preferable.

The number of the water-soluble groups that (Component A) may have is not limited, and for example, the number may be one or a plural number. The number is appropriately selected according to the kind, molecular weight and the like of the water-soluble group.

(Component A) may be a low molecular weight compound having a weight average molecular weight of from 300 to 2,000, or may be a polymer compound having a weight average molecular weight of 5,000 or more. From the viewpoints of solvent resistance and adhesiveness to a base material after the ink composition is cured, (Component A) is preferably a polymer compound having a weight average molecular weight of 5,000 or more.

When (Component A) is a low molecular weight compound having a weight average molecular weight of from 300 to 2,000, (Component A) preferably has from 2 to 6, more preferably from 2 to 4, even more preferably from 2 to 3, and particularly preferably 2, of the group represented by Structural Formula (1) in one molecule of (Component A).

When (Component A) is a low molecular weight compound having a weight average molecular weight of from 300 to 2,000, (Component A) is preferably a compound represented by the following Formula (1-L):

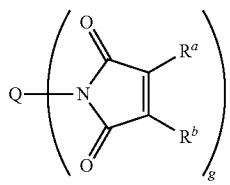

(1-L)

wherein, in Formula (1-L), $R^a$ and $R^b$ each independently represent an alkyl group having 1 to 4 carbon atoms, and $R^a$ and $R^b$ may be bonded to each other to form a 4-membered to 6-membered ring; Q represents a linking group having a valency of g; and g represents an integer of 2 or larger.

In Formula (1-L), $R^a$ and $R^b$ each independently represent an alkyl group having 1 to 4 carbon atoms, and $R^a$ and $R^b$ may be bonded to each other to form a 4-membered to 6-membered ring. The details of $R^a$ and $R^b$ in Formula (1-L) are the same as the details of $R^a$ and $R^b$ in the above-described Structural Formula (1), respectively. Examples of $R^a$ and $R^b$ in Formula (1-L) are the same as the examples (also including preferable examples) of $R^a$ and $R^b$ in the above-described Structural Formula (1), respectively.

In Formula (1-L), Q represents a linking group having a valency of g. Q is preferably a linking group having a valency of g and having a water-soluble group, and more preferably a residue obtained by eliminating g hydrogen atoms from a hydrocarbon substituted with a water-soluble group. When Q is a residue obtained by eliminating g hydrogen atoms from a hydrocarbon substituted with a water-soluble group, an ether group, an ester group, an amino group, an amide bond, a silyl ether group, a thiol group, or the like may be present in the hydrocarbon. The hydrocarbon preferably has 1 to 30 carbon atoms, and more preferably 1 to 20 carbon atoms. The hydrocarbon is preferably an aromatic hydrocarbon, and examples of the aromatic hydrocarbon include benzene and naphthalene.

In Formula (1-L), g represents an integer of 2 or larger, and is preferably from 2 to 6, more preferably from 2 to 4, even more preferably from 2 to 3, and particularly preferably 2.

When (Component A) is a low molecular weight compound having a weight average molecular weight of from 300 to 2,000, the following compounds (1-1) to (1-3) can be preferably used in the invention.

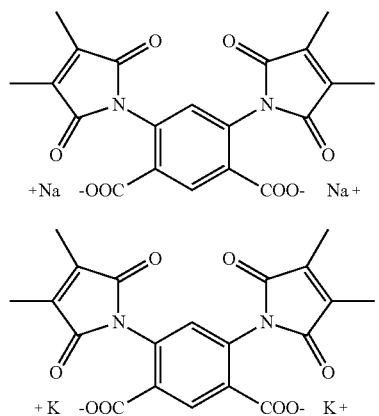

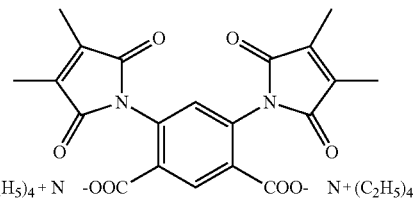

(1-3)

When (Component A) is a polymer compound having a weight average molecular weight of 5,000 or more, (Component A) may contain two or more groups represented by Structural Formula (1) in one molecule of (Component A). There are no particular limitations on the number of the groups represented by Structural Formula (1), but the number is preferably from 2 to 500, and more preferably from 10 to 200.

Furthermore, when (Component A) is a polymer compound, it is preferable that at least one of the groups represented by Structural Formula (1) be present in a side chain of the polymer compound, and it is more preferable that two or more groups represented by Structural Formula (1) be present in a side chain of the polymer compound.

When (Component A) is a polymer compound, the weight average molecular weight of (Component A) is preferably from 5,000 to 200,000, more preferably from 7,000 to 100,000, even more preferably from 10,000 to 50,000, and particularly preferably from 10,000 to 40,000.

The weight average molecular weight is measured by gel permeation chromatography (GPC). In GPC, HLC-8020GPC (manufactured by Tosoh Corp.) is used, the columns used are TSKgel SuperHZM-H, TSKgel SuperHZ4000, and TSKgel SuperHZ200 (manufactured by Tosoh Corp., 4.6 mm ID×15 cm), and THF (tetrahydrofuran) is used as an eluent.

When (Component A) is a polymer compound having a weight average molecular weight of 5,000 or more, there are no limitations on the polymer structure as long as (Component A) is a polymer compound having a group represented by Structural Formula (1) in a side chain or at a terminal end of the polymer compound, and a polymer structure such as polyacrylate, polyester, polyethyleneimine, polystyrene or the like can be used. (Component A) preferably has a polyacrylate structure.

When (Component A) is a polymer compound, (Component A) is preferably a polymer compound containing a structure represented by the following Formula (1'):

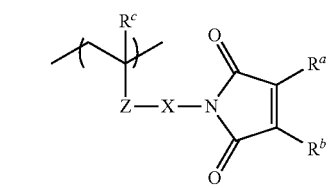

(1')

wherein in Formula (1'), $R^a$ and $R^b$ each independently represent an alkyl group having 1 to 4 carbon atoms, and $R^a$ and $R^b$ may be bonded to each other to form a 4-membered to 6-membered ring; $R^c$ represents a hydrogen atom or a methyl group; Z represents —COO— or —CONR$^d$—; $R^d$ represents a hydrogen atom or an alkyl group having 1 to 4 carbon atoms; and X represents a divalent organic group.

In Formula (1'), $R^a$ and $R^b$ each independently represent an alkyl group having 1 to 4 carbon atoms, and $R^a$ and $R^b$ may be bonded to each other to form a 4-membered to 6-membered ring. The details of $R^a$ and $R^b$ in Formula (1') are the same as the details of $R^a$ and $R^b$ in the above-described Structural Formula (1). Examples of $R^a$ and $R^b$ in Formula (1') are the same as the examples (also including preferred examples) of $R^a$ and $R^b$ in the above-described Structural Formula (1).

In Formula (1'), $R^c$ represents a hydrogen atom or a methyl group. $R^c$ is preferably a methyl group.

In Formula (1'), Z represents —COO— or —CONR$^d$—. Z is preferably —COO—.

$R^d$ represents a hydrogen atom or an alkyl group having 1 to 4 carbon atoms. The alkyl group having 1 to 4 carbon atoms may have a straight chain structure or a branched structure. Specific examples thereof include a methyl group, an ethyl group, a propyl group, an isopropyl group, a butyl group, an isobutyl group, a sec-butyl group, and a t-butyl group. $R^d$ is preferably a hydrogen atom or an alkyl group having 1 or 2 carbon atoms, that is, a methyl group or an ethyl group, and is particularly preferably a hydrogen atom. $R^d$ may have a substituent or may have no substituent, but it is preferable that $R^d$ do not have a substituent.

In Formula (1'), X represents a divalent organic group. The divalent organic group is preferably an alkylene group. The alkylene group may have a straight chain structure, a branched structure, or a cyclic structure. Furthermore, an ether bond, an ester bond, an amide bond, a urethane bond, or an arylene group may be present in the alkylene group. When X is an alkylene group, the alkylene group preferably has from 2 to 20 carbon atoms, more preferably from 2 to 12 carbon atoms, and even more preferably from 2 to 8 carbon atoms.

In Formula (1'), it is preferable that $R^a$ and $R^b$ each independently represent an alkyl group having 1 to 2 carbon atoms; $R^c$ represents a methyl group; Z represents —COO—; and X represents an alkylene group having 2 to 12 carbon atoms.

When (Component A) is a polymer compound containing a structure represented by Formula (1'), the copolymerization ratio of the repeating unit of Formula (1') in (Component A) is preferably from 10% to 90% by mass, more preferably from 25% to 80% by mass, and particularly preferably from 30% to 75% by mass, with respect to (Component A).

When (Component A) is a polymer compound containing a structure represented by Formula (1'), the polymer compound is preferably a polymer compound obtained by polymerizing a monomer represented by the following Formula (1'-M). The polymerization is preferably copolymerization of a monomer represented by Formula (1'-M) and a monomer having a water-soluble group.

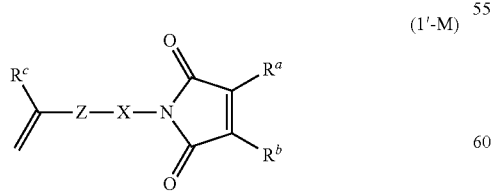

(1'-M)

$R^a$, $R^b$, $R^c$, Z and X in Formula (1'-M) have the same definitions (also including preferable examples) as $R^a$, $R^b$, $R^c$, Z and X in the above-described Formula (1'), respectively. Preferable examples of the monomer represented by Formula (1'-M) include the following compounds (1-1-1) to (1-1-16), but the invention is not limited to these.

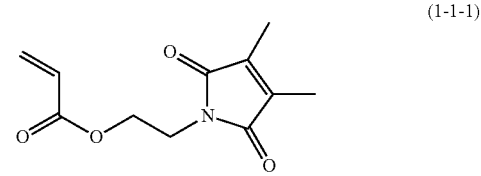
(1-1-1)

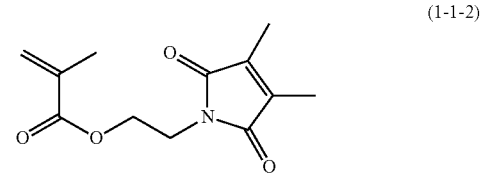
(1-1-2)

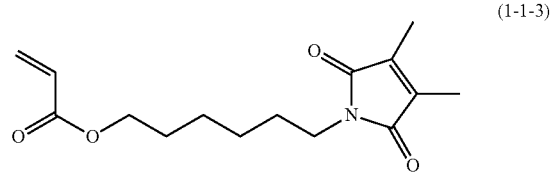
(1-1-3)

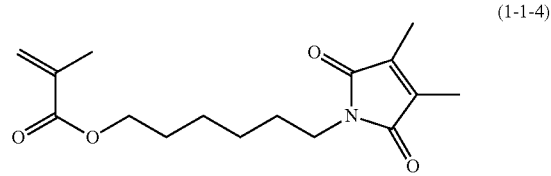
(1-1-4)

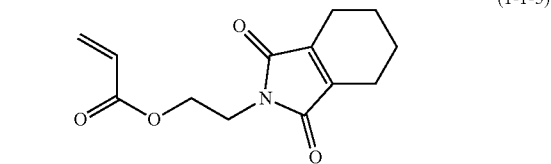
(1-1-5)

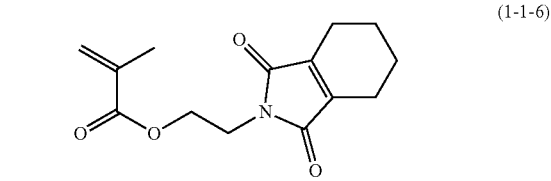
(1-1-6)

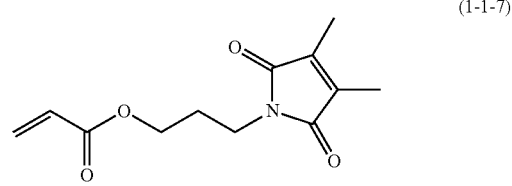
(1-1-7)

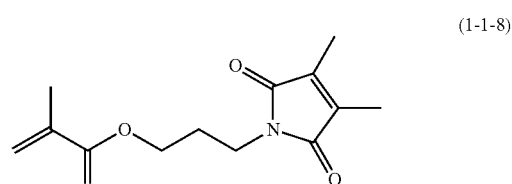
(1-1-8)

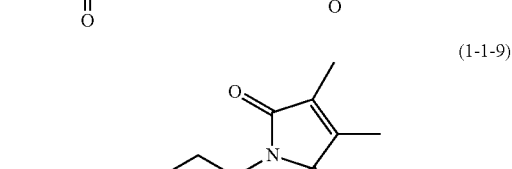
(1-1-9)

(1-1-10)
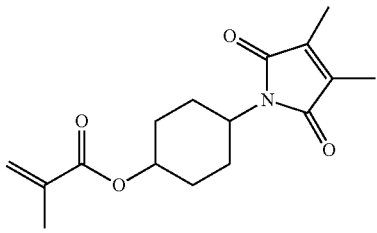

(1-1-11)
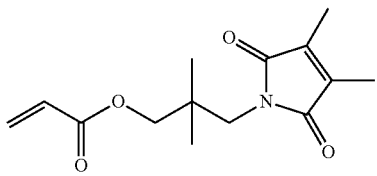

(1-1-12)
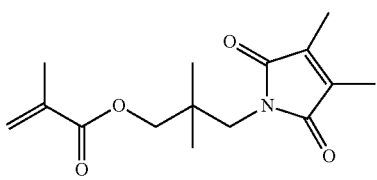

(1-1-13)
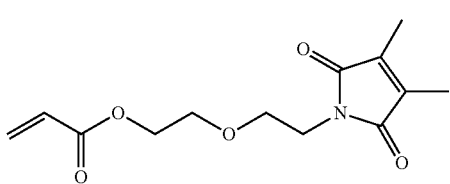

(1-1-14)
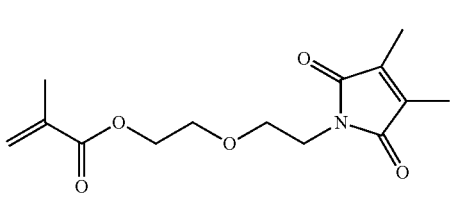

(1-1-15)
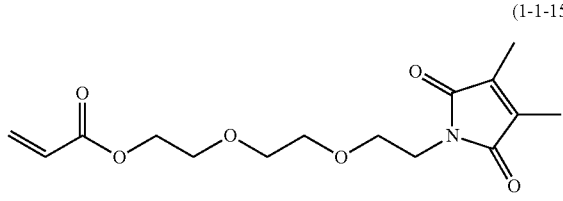

(1-1-16)
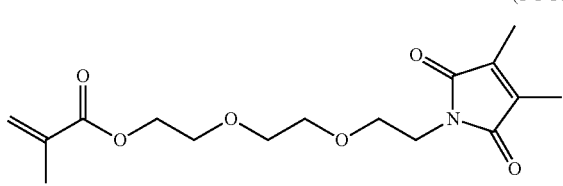

When (Component A) is a polymer compound, the polymer compound preferably has a structure represented by the following Formula (1'-C1), in addition to the structure represented by Formula (1').

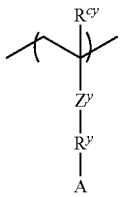

(1'-C1)

In Formula (1'-C1), $R^{cy}$ represents a hydrogen atom or a methyl group. $Z^y$ represents —COO—, —CONR$^{dy}$— or a single bond; and $R^{dy}$ represents a hydrogen atom or an alkyl group having 1 to 4 carbon atoms. $R^y$ represents a single bond or a divalent organic group. A represents a water-soluble group.

In Formula (1'-C1), $R^{cy}$ represents a hydrogen atom or a methyl group, and is preferably a hydrogen atom.

In Formula (1'-C1), $Z^y$ represents —COO—, —CONR$^{dy}$— or a single bond, and is preferably —COO—. $R^{dy}$ represents a hydrogen atom or an alkyl group having 1 to 4 carbon atoms. The alkyl group having 1 to 4 carbon atoms may have a straight chain structure or a branched structure. Specific examples thereof include a methyl group, an ethyl group, a propyl group, an isopropyl group, a butyl group, an isobutyl group, a sec-butyl group, and a t-butyl group. $R^{dy}$ is preferably a hydrogen atom or an alkyl group having 1 or 2 carbon atoms, that is, a methyl group or an ethyl group, and particularly preferably a hydrogen atom. $R^{dy}$ may have a substituent or may have no substituent, but $R^{dy}$ preferably does not have a substituent.

In Formula (1'-C1), $R^y$ represents a single bond or a divalent organic group. When $R^y$ is a divalent organic group, the divalent organic group is preferably an alkylene group having 1 to 20 carbon atoms, an arylene group having 6 to 20 carbon atoms, or an aralkylene group having 7 to 20 carbon atoms. These groups may have a substituent or may have no substituent. Furthermore, these groups may contain an ether bond, an ester bond, an amide bond, or a urethane bond.

When $R^y$ is an alkylene group having 1 to 20 carbon atoms, the alkylene group may have a straight chain structure, a branched structure, or a cyclic structure. When $R^y$ is an alkylene group, the alkylene group more preferably has 2 to 12 carbon atoms, and even more preferably 2 to 8 carbon atoms. Specific examples of the alkylene group of $R^y$ include —CH$_2$—, —C$_2$H$_4$—, —C(CH$_3$)$_2$—CH$_2$—, —CH$_2$C(CH$_3$)$_2$CH$_2$—, —C$_6$H$_{12}$—, C$_4$H$_7$(C$_4$H$_9$)C$_4$H$_8$—, C$_{18}$H$_{36}$—, 1,4-trans-cyclohexylene group, —C$_2$H$_4$—OCO—C$_2$H$_4$—, —C$_2$H$_4$—OCO—, —C$_2$H$_4$—O—C$_5$H$_{10}$—, —CH$_2$—O—C$_5$H$_9$(C$_5$H$_{11}$)—, —C$_2$H$_4$—CONH—C$_2$H$_4$—, —C$_2$H$_4$—CONH—, —C$_4$H$_8$—OCONH—C$_6$H$_{12}$—, and —CH$_2$—OCONHC$_{10}$H$_{20}$—.

When $R^y$ is an arylene group having 6 to 20 carbon atoms, the arylene group preferably has 6 to 18 carbon atoms, more preferably 6 to 14 carbon atoms, and most preferably 6 to 10 carbon atoms. Specific examples of the arylene group of $R^y$ include a phenylene group, a biphenylene group, —C$_6$H$_4$—CO—C$_6$H$_4$—, and a naphthylene group.

When $R^y$ is an aralkylene group having 7 to 20 carbon atoms, the aralkylene group preferably has 7 to 18 carbon atoms, more preferably 7 to 14 carbon atoms, and most preferably 7 to 10 carbon atoms. Specific examples of the aralkylene group include C$_3$H$_6$—C$_6$H$_4$—, —C$_2$H$_4$—C$_6$H$_4$—C$_6$H$_4$—, —CH$_2$—C$_6$H$_4$—C$_6$H$_4$—C$_2$H$_4$—, and —C$_2$H$_4$—OCO—C$_6$H$_4$—.

A in Formula (1'-C1) represents a water-soluble group, and A is preferably —COOM$^1$, —SO$_3$M$^1$, —P(O)(OM$^2$)$_2$, or —OP(O)(OM$^2$)$_2$; more preferably —COOM$^1$ or —SO$_3$M$^1$; and most preferably —COOM$^1$.

M$^1$ represents an alkali metal or an onium ion, and is preferably an alkali metal. Specific examples of M$^1$ include a lithium atom, a sodium atom, a potassium atom, and an ammonium ion.

M$^2$ represents a hydrogen atom, an alkali metal, or an onium ion, and is preferably a hydrogen atom. Specific examples of M$^2$ include a hydrogen atom, a lithium atom, a sodium atom, a potassium atom, and an ammonium ion.

It is preferable that A be —COOM$^1$ or —SO$_3$M$^1$, and M$^1$ be an alkali metal; and it is more preferable that A be —COOM$^1$, and M$^1$ be an alkali metal.

In Formula (1'-C1), it is preferable that R$^{cy}$ be a hydrogen atom; Z$^y$ be —COO—; R$^y$ be a single bond, an alkylene group having 2 to 8 carbon atoms, or an arylene group having 6 to 10 carbon atoms; and A be —COOM$^1$ or —SO$_3$M$^1$.

When (Component A) is a polymer compound containing a structure represented by Formula (1'-C1), the copolymerization ratio of the repeating unit of Formula (1'-C1) in (Component A) is preferably from 10% to 70% by mass, more preferably from 12% to 60% by mass, and particularly preferably from 15% to 50% by mass, with respect to (Component A).

The structure represented by Formula (1'-C1) can be obtained by polymerizing a monomer represented by the following Formula (1'-C1-M):

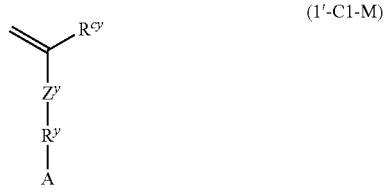

(1'-C1-M)

R$^{cy}$, Z$^y$, R$^y$ and A in Formula (1'-C1-M) have the same definitions and the same preferred examples as R$^{cy}$, Z$^y$, R$^y$ and A in Formula (1'-C1), respectively.

Preferable examples of the monomer represented by Formula (1'-C1-M) include the following compounds (1'-C1-1) to (1'-C1-15), but the invention is not limited to these.

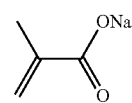

(1'-C1-1)

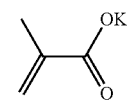

(1'-C1-2)

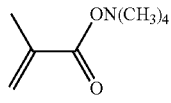

(1'-C1-3)

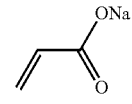

(1'-C1-4)

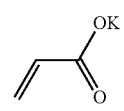

(1'-C1-5)

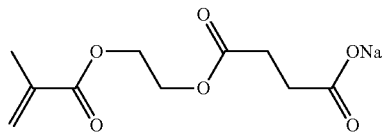

(1'-C1-6)

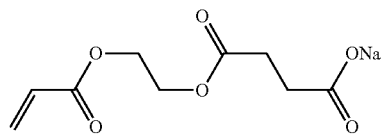

(1'-C1-7)

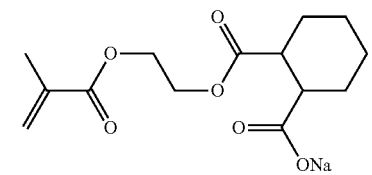

(1'-C1-8)

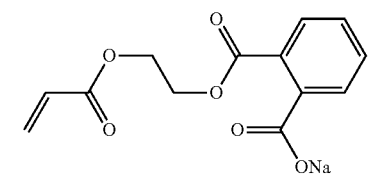

(1'-C1-9)

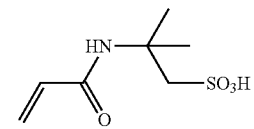

(1'-C1-10)

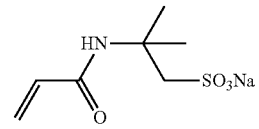

(1'-C1-11)

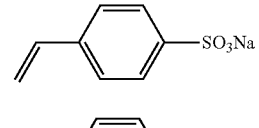

(1'-C1-12)

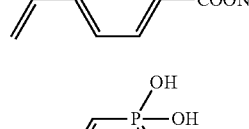

(1'-C1-13)

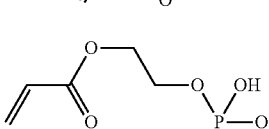

(1'-C1-14)

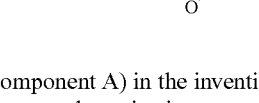

(1'-C1-15)

When (Component A) in the invention is a polymer compound, other copolymerization components may also be used, in addition to the monomer represented by Formula (1'-M) and the monomer having a structure represented by Formula (1'-C1-M).

Examples of the other copolymerization components include styrene, p-methoxystyrene, methyl (meth)acrylate, ethyl (meth)acrylate, allyl (meth)acrylate, butyl (meth)acrylate, hexyl (meth)acrylate, 2-ethylhexyl (meth)acrylate, octyl (meth)acrylate, decyl (meth)acrylate, stearyl (meth)acrylate, cyclohexyl (meth)acrylate, bornyl (meth)acrylate, isobornyl (meth)acrylate, benzyl (meth)acrylate, 2-ethylhexyl diglycol (meth)acrylate, butoxyethyl (meth)acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, 2,2,2-trifluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, 3-hydroxypropyl (meth)acrylate, butoxyethylene glycol (meth)acrylate, trifluoroethyl (meth)acrylate, perfluorooctylethyl (meth)acrylate, 2-hydroxy-3-phenoxypropyl (meth)acrylate, (meth)acrylamide, N-butyl (meth)acrylamide, N-p-hydroxyphenyl (meth)acrylamide, and p-sulfamoylphenyl (meth)acrylamide.

Preferable examples of copolymerizable monomers include alkyl (meth)acrylate having about 1 to about 8 carbon atoms, such as methyl (meth)acrylate, ethyl (meth)acrylate, butyl (meth)acrylate, hexyl (meth)acrylate, or 2-ethylhexyl (meth)acrylate. Known monomers other than those described above can also be used, if necessary.

Examples of (Component A) include the following compounds (A-1) to (A-11), but the invention is not limited to these.

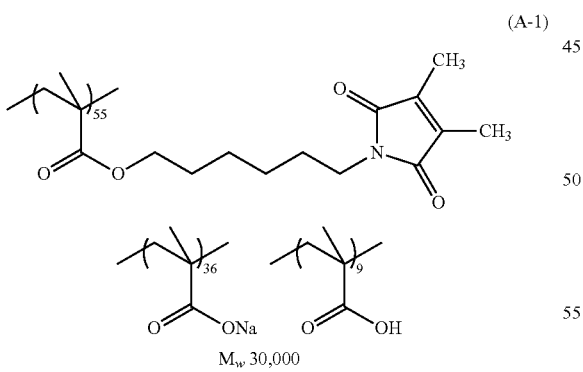

(A-1)

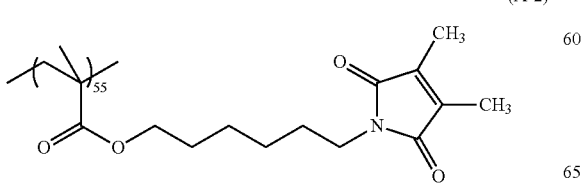

$M_w$ 30,000

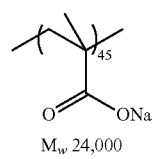

(A-2)

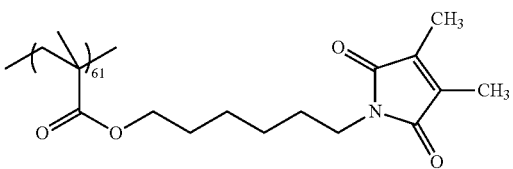

$M_w$ 24,000

(A-3)

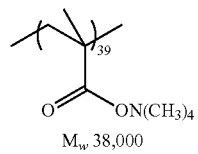

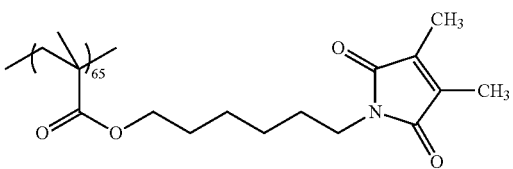

$M_w$ 38,000

(A-4)

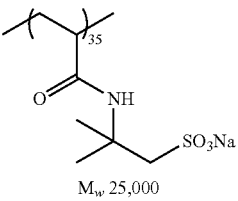

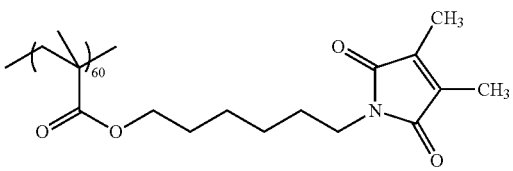

$M_w$ 25,000

(A-5)

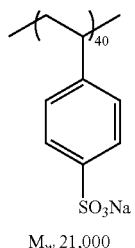

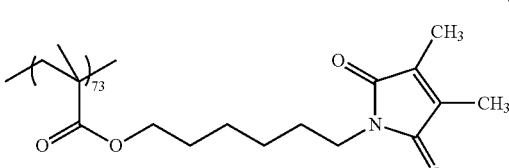

$M_w$ 21,000

(A-6)

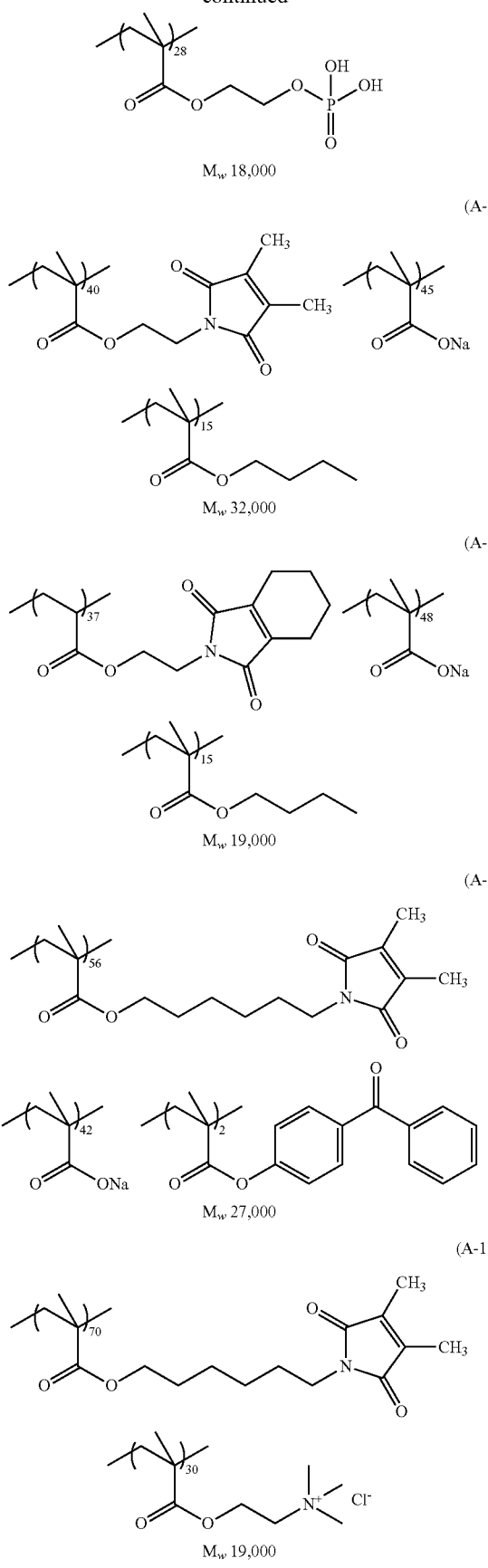

In the invention, as (Component A), compounds (A-1) to (A-9) can be preferably used, compounds (A-1) to (A-3) and (A-7) to (A-9) are more preferable, and compounds (A-1), (A-2) and (A-7) are particularly preferable.

In general, (Component A) or a precursor thereof in the invention can be produced by a conventional known method. For example, low molecular weight compounds such as compounds (1-1) to (1-3) can be produced with reference to the method described in US 2009/0224203 A1; Synlett Vol. 13, pp. 2172-2176 (2009); Journal of Polymer Science Part A-1, Polymer Chemistry, Vol. 10, No. 6, pp. 1687-1699 (1972); or the like. The acrylates as precursors for the polymer compounds such as compounds (1-1-1) to (1-1-16) can be produced with reference to the methods described in JP-A No. 52-988; JP-A No. 4-251258; Macromolecules, Vol. 39, pp. 1585-1691 (2006); or the like. The compounds as precursors for the polymer compounds such as exemplary compounds (1'-C1-1) to (1'-C1-15) are ones that are commercially available compounds, or compounds obtained by neutralizing the acidic groups of the commercially available compound with a hydroxide of an alkali metal and the like. Polymer compounds such as compounds (A-1) to (A-11) can be obtained by polymerizing the above-described precursor by a known polymerization method, and optionally neutralizing the acidic group by using a hydroxide of an alkali metal and the like, and can be produced, for example, by a method in accordance with the polymerization methods described in JP-A No. 52-988; JP-A No. 55-154970; Langmuir, Vol. 18, No. 14, pp. 5414-5421 (2002); and the like.

The content of (Component A) in the ink composition is preferably 1% to 50% by mass, more preferably 3% to 35% by mass, and even more preferably 5% to 20% by mass, with respect to the ink composition.

<(Component B) Compound Represented by Formula (2)>

Regarding the compound represented by the following Formula (2) that is used in the invention, any compound can be used without any limitations as long as the compound is represented by Formula (2).

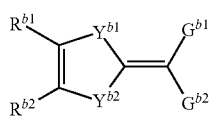

In Formula (2), $R^{b1}$ and $R^{b2}$ each independently represent a hydrogen atom, an alkyl group, an aryl group, an alkenyl group, or a residue obtained by eliminating one hydrogen atom from a heterocyclic compound, and $R^{b1}$ and $R^{b2}$ may also be bonded to each other to form a ring.

$Y^{b1}$ and $Y^{b2}$ each independently represent a divalent group selected from the group consisting of —O—, —S—, —$NR^{b3}$— (wherein $R^{b3}$ represents a hydrogen atom, an alkyl group, an aryl group, or an alkenyl group), —Se—, —C($CH_3$)$_2$— and —CH=CH—.

$G^{b1}$ and $G^{b2}$ each independently represent a hydrogen atom, a cyano group, an amide group, an alkoxycarbonyl group, an aryloxycarbonyl group, an acyl group, an arylcarbonyl group, an alkylsulfanyl group, an arylsulfanyl group, an alkylsulfonyl group, an arylsulfonyl group, or a fluoroalkylsulfonyl group, and $G^{b1}$ and $G^{b2}$ may also be bonded to each other to form a ring. However, when $G^{b1}$ and $G^{b2}$ form a ring, the ring may contain, in the ring, a divalent linking group selected from the group consisting of —C(=O)—, —C(=S)—, —$NR^{12}$— (wherein $R^{12}$ represents a hydrogen atom, an alkyl group, or an aryl group), —N=$CR^{13}$— (wherein $R^{13}$ represents a hydrogen atom, an alkyl group, or an aryl group), —O— and —S—.

At least one of $R^{b1}$, $R^{b2}$, $Y^{b1}$, $Y^{b2}$, $G^{b1}$ $G^{b2}$ is substituted with at least one hydrophilic group.

$R^{b1}$ and $R^{b2}$ each independently represent a hydrogen atom, an alkyl group, an aryl group, an alkenyl group, or a residue obtained by eliminating one hydrogen atom from a heterocyclic compound, and $R^{b1}$ and $R^{b2}$ may also be bonded to each other to form a ring. The alkyl group, aryl group, alkenyl group, and residue obtained by eliminating one hydrogen atom from a heterocyclic compound may have a substituent or may have no substituent.

$R^{b1}$ and $R^{b2}$ are each independently preferably a hydrogen atom, an alkyl group, or an alkenyl group, and even more preferably a hydrogen atom or an alkyl group.

When at least one of $R^{b1}$ and $R^{b2}$ is an alkyl group, the alkyl group is preferably an alkyl group having 1 to 12 carbon atoms, and more preferably an alkyl group having 1 to 4 carbon atoms. Examples of the alkyl group include a methyl group, an ethyl group, a propyl group, an isopropyl group, a butyl group, an isobutyl group, a sec-butyl group, a tert-butyl group, a pentyl group, an isopentyl group, a neopentyl group, a 1-ethylpropyl group, a hexyl group, an isohexyl group, a 1,1-dimethylbutyl group, a 2,2-dimethylbutyl group, a 3,3-dimethylbutyl group, a 2-ethylbutyl group, a heptyl group, an octyl group, a nonyl group, and a decyl group.

When at least one of $R^{b1}$ and $R^{b2}$ is an aryl group, the aryl group is preferably an aryl group having 6 to 20 carbon atoms, and more preferably an aryl group having 6 to 10 carbon atoms. Examples of the aryl group include a phenyl group, a naphthyl group, an anthryl group, a phenanthryl group, an acenaphthylenyl group, and a biphenylyl group. Among these, examples thereof include a phenyl group, a 1-naphthyl group, and a 2-naphthyl group.

When at least one of $R^{b1}$ and $R^{b2}$ is an alkenyl group, the alkenyl group is preferably an alkenyl group having 2 to 12 carbon atoms, and more preferably an alkenyl group having 2 to 6 carbon atoms. Examples of the alkenyl group include an ethenyl group, a 1-propenyl group, a 2-propenyl group, a 2-methyl-1-propenyl group, a 1-butenyl group, a 2-butenyl group, a 3-butenyl group, a 3-methyl-2-butenyl group, a 1-pentenyl group, a 2-pentenyl group, a 3-pentenyl group, a 4-pentenyl group, a 4-methyl-3-pentenyl group, a 1-hexenyl group, a 3-hexenyl group, a 5-hexenyl group, a 1-heptenyl group, and a 1-octenyl group.

When at least one of $R^{b1}$ and $R^{b2}$ is a residue obtained by eliminating one hydrogen atom from a heterocyclic compound (hereinafter, also referred to as a "heterocyclic group"), example of the residue include a 5-membered to 7-membered monocyclic non-aromatic heterocyclic group containing 1 to 4 heteroatoms selected from the group consisting of an oxygen atom, a sulfur atom and a nitrogen atom, in addition to carbon atoms as the ring-constituting atoms, and a condensed non-aromatic heterocyclic group. Examples of the condensed non-aromatic heterocyclic group include a group formed by condensing the 5-membered to 7-membered monocyclic non-aromatic heterocyclic group with a 6-membered ring containing one to two nitrogen atoms, a benzene ring, or a 5-membered ring containing one sulfur atom. The non-aromatic heterocyclic group also include a bridged ring group.

Specific examples of the non-aromatic heterocyclic group include pyrrolidinyl (for example, 1-pyrrolidinyl, 2-pyrrolidinyl, or 3-pyrrolidinyl), piperidinyl (for example, piperidino), morpholinyl (for example, morpholino), thiomorpholinyl (for example, thiomorpholino), piperazinyl (for example, 1-piperazinyl), hexamethyleneiminyl (for example, hexamethyleneimin-1-yl), oxazolidinyl (for example, oxazolidin-3-yl), thiazolidinyl (for example, thiazolidin-3-yl), imidazolidinyl (for example, imidazolidin-3-yl), oxoimidazolidinyl (for example, 2-oxoimidazolidin-1-yl), dioxoimidazolidinyl (for example, 2,4-dioxoimidazolidin-3-yl), dioxooxazolidinyl (for example, 2,4-dioxooxazolidin-3-yl, 2,4-dioxooxazolidin-5-yl, or 2,4-dioxooxazolidin-1-yl), dioxothiazolidinyl (for example, 2,4-dioxothiazolidin-3-yl or 2,4-dioxothiazolidin-5-yl), dioxoisoindolinyl (for example, 1,3-dioxoisoindolin-2-yl), oxooxadiazolidinyl (for example, 5-oxooxadiazolidin-3-yl), oxothiadiazolidinyl (for example, 5-oxothiadiazolidin-3-yl), oxopiperazinyl (for example, 3-oxopiperazin-1-yl), dioxopiperazinyl (for example, 2,3-dioxopiperazin-1-yl or 2,5-dioxopiperazin-1-yl), oxodioxolyl (for example, 2-oxo-1,3-dioxol-4-yl), oxodioxolanyl (for example, 2-oxo-1,3-dioxolan-4-yl), 3-oxo-1,3-dihydro-2-benzofuranyl (for example, 3-oxo-1,3-dihydro-2-benzofuran-1-yl), oxodihydrooxadiazolyl (for example, 5-oxo-4,5-dihydro-1,2,4-oxadiazol-3-yl), oxodihydropyrazolyl (for example, 5-oxo-4,5-dihydro-1H-pyrazol-3-yl), 4-oxo-2-thioxo-1,3-thiazolidin-5-yl, 4-oxo-2-thioxo-1,3-oxazolidin-5-yl, tetrahydropyranyl (for example, 4-tetrahydropyranyl), 4-oxo-4,5,6,7-tetrahydro-1-benzofuranyl (for example, 4-oxo-4,5,6,7-tetrahydro-1-benzofuran-3-yl), 1,3-(2H,5H)-dioxotetrahydroimidazo[1,5-a]pyridinyl, 1,3-(2H,5H)-dioxo-10,10a-dihydroimidazo[1,5-b]isoquinolinyl, and azabicyclooctyl (for example, 1-azabicyclo[2.2.2]octan-2-yl or 1-azabicyclo[2.2.2]octan-3-yl).

When $R^{b1}$ and $R^{b2}$ are bonded to each other to form a ring, it is preferable that $R^{b1}$ and $R^{b2}$ be bonded to each other to form a benzene ring or a naphthalene ring, and it is more preferable that $R^{b1}$ and $R^{b2}$ be bonded to each other to form a benzene ring. Moreover, the ring structure formed by $R^{b1}$ and $R^{b2}$ bonded to each other may be substituted with a substituent, and preferable examples of the substituent include a halogen atom (for example, fluorine, chlorine, or bromine); an alkyl group having 1 to 12 carbon atoms such as methyl, ethyl, n-propyl, isopropyl, n-butyl, or t-butyl; an aryl group having 6 to 10 carbon atoms such as a phenyl group or a naphthyl group; an allyl group having 3 to 10 carbon atoms; and an alkoxy group having 1 to 6 carbon atoms, such as a methoxy group or an ethoxy group.

$Y^{b1}$ and $Y^{b2}$ each independently represent a divalent group selected from the group consisting of —O—, —S—, —$NR^{b3}$— (wherein $R^{b3}$ represents a hydrogen atom, an alkyl group, an aryl group, or an alkenyl group), —Se—, —C $(CH_3)_2$—, and —CH=CH—. The alkyl group, aryl group and alkenyl group may have a substituent or may have no substituent.

$Y^{b1}$ and $Y^{b2}$ are each independently preferably —O—, —S— or —NR$^{b3}$—; more preferably —S— or —NR$^{b3}$—; and most preferably —S—.

When $R^{b3}$ is an alkyl group, the alkyl group preferably has 1 to 8 carbon atoms, and more preferably 1 to 4 carbon atoms.

When $R^{b3}$ is an aryl group, the aryl group preferably has 6 to 10 carbon atoms, and more preferably 6 carbon atoms.

When $R^{b3}$ is an alkenyl group, the alkenyl group is preferably 2 to 8 carbon atoms, and more preferably 2 to 4 carbon atoms.

$G^{b1}$ and $G^{b2}$ each independently represent a hydrogen atom, a cyano group, an amide group, an alkoxycarbonyl group, an aryloxycarbonyl group, an acyl group, an arylcarbonyl group, an alkylsulfanyl group, an arylsulfanyl group, an alkylsulfonyl group, an arylsulfonyl group, or a fluoroalkylsulfonyl group, and $G^{b1}$ and $G^{b2}$ may also be bonded to each other to form a ring. However, when $G^{b1}$ and $G^{b2}$ form a ring, the ring may contain, in the ring, a divalent linking group selected from the group consisting of —C(=O)—, —C(=S)—, —NR$^{12}$— (wherein R$^{12}$ represents a hydrogen atom, an alkyl group, or an aryl group), —N=CR$^{13}$— (wherein R$^{13}$ represents a hydrogen atom, an alkyl group, or an aryl group), —O—, and —S—.

The amide group, alkoxycarbonyl group, aryloxycarbonyl group, acyl group, arylcarbonyl group, alkylsulfanyl group, arylsulfanyl group, alkylsulfonyl group, arylsulfonyl group, and fluoroalkylsulfonyl group may have a substituent or may have no substituent.

$G^{b1}$ and $G^{b2}$ are each independently preferably an amide group, an acyl group, or an alkylsulfanyl group, and more preferably an amide group or an alkylsulfanyl group.

When at least one of $G^{b1}$ and $G^{b2}$ is an alkoxycarbonyl group, the alkoxycarbonyl group preferably has 2 to 8 carbon atoms, and more preferably 2 to 4 carbon atoms.

When at least one of $G^{b1}$ and $G^{b2}$ is an aryloxycarbonyl group, the aryloxycarbonyl group preferably has 7 to 15 carbon atoms, and more preferably 7 to 11 carbon atoms.

When at least one of $G^{b1}$ and $G^{b2}$ is an acyl group, the acyl group preferably has 2 to 8 carbon atoms, and more preferably 2 to 4 carbon atoms.

When at least one of $G^{b1}$ and $G^{b2}$ is an arylcarbonyl group, the arylcarbonyl group preferably has 7 to 15 carbon atoms, and more preferably 7 to 11 carbon atoms.

When at least one of $G^{b1}$ and $G^{b2}$ is an alkylsulfanyl group, the alkylsulfanyl group preferably has 1 to 8 carbon atoms, and more preferably 1 to 4 carbon atoms.

When at least one of $G^{b1}$ and $G^{b2}$ is an arylsulfanyl group, the arylsulfanyl group preferably has 6 to 14 carbon atoms, and more preferably 6 to 10 carbon atoms.

When at least one of $G^{b1}$ and $G^{b2}$ is an alkylsulfonyl group, the alkylsulfonyl group preferably has 1 to 8 carbon atoms, and more preferably 1 to 4 carbon atoms.

When at least one of $G^{b1}$ and $G^{b2}$ is an arylsulfonyl group, the arylsulfonyl group preferably has 6 to 14 carbon atoms, and more preferably 6 to 10 carbon atoms.

When at least one of $G^{b1}$ and $G^{b2}$ is a fluoroalkylsulfonyl group, the fluoroalkylsulfonyl group preferably has 1 to 8 carbon atoms, and more preferably 1 to 4 carbon atoms.

When $R^{12}$ is an alkyl group, the alkyl group preferably has 1 to 8 carbon atoms, and more preferably 1 to 4 carbon atoms. When $R^{12}$ is an aryl group, the aryl group preferably has 6 to 14 carbon atoms, and more preferably 6 to 10 carbon atoms. The alkyl group and aryl group for $R^{12}$ may or may not have a substituent.

When $R^{13}$ is an alkyl group, the alkyl group preferably has 1 to 8 carbon atoms, and more preferably 1 to 4 carbon atoms. When $R^{13}$ is an aryl group, the aryl group preferably has 6 to 14 carbon atoms, and more preferably 6 to 10 carbon atoms. The alkyl group and aryl group for $R^{13}$ may or may not have a substituent.

Examples of the ring in the case in which $G^{b1}$ and $G^{b2}$ are bonded to each other to form a ring, include such as those that are generally used as an acidic nucleus of merocyanine dye, for example, examples thereof include the followings.

(1) 1,3-dicarbonyl nucleus, for example, 1,3-indanedione, 1,3-cyclohexanedione, 5,5-dimethyl-1,3-cyclohexanedione, or 1,3-dioxane-4,6-dione;

(2) pyrazolinone nucleus, for example, 3-methyl-1-phenyl-2-pyrazolin-5-one, 1-phenyl-2-pyrazolin-5-one, or 1-(2-benzothiazolin)-3-methyl-2-pyrazolin-5-one;

(3) isooxazolinone nucleus, for example, 3-phenyl-2-isooxazolin-5-one or 3-methyl-2-isooxazolin-5-one;

(4) oxindole nucleus, for example, 1-alkyl-2,3-dihydro-2-oxindole;

(5) 2,4,6-triketohexahydropyrimidine nucleus, for example, barbituric acid or 2-thiobarbituric acid and a derivative thereof; examples of the derivative include 1-alkyl forms such as 1-methyl and 1-ethyl; 1,3-dialkyl forms such as 1,3-diethyl and 1,3-dibutyl; 1,3-diaryl forms such as 1,3-diphenyl, 1,3-di(p-chlorophenyl), and 1,3-di(p-ethoxycarbonylphenyl); 1-alkyl-3-aryl forms such as 1-ethyl-3-phenyl; as well as a derivative having a functional group in the 1 position and/or the 3 position, such as 1-allyl-3-carboxypentyl, 1,3-bis(carboxypentyl), 1-carboxypropyl-3-phenyl, 1-carboxypropyl-3-(4-hydroxyphenyl), 1-carboxyphenyl-3-phenyl, 1,3-bis(carboxyphenyl), 1-allyl-3-{2-(N-phenylsulfamoyl)ethyl}, 1-ethyl-3-{2-(N-benzoylsulfamoyl)ethyl}, 1,3-bis(hydroxyphenyl), or 1-allyl-3-{2-(benzenesulfonylaminosulfonyl)ethyl};

(6) 2-thio-2,4-thiazolidinedione nucleus, for example, rhodanine and derivatives thereof; examples of the derivative include 3-alkylrhodanines such as 3-ethylrhodanine and 3-allylrhodanine; 3-arylrhodanines such as 3-phenylrhodanine; 3-carboxyalkylrhodanines such as 3-carboxymethylrhodanine and 3-carboxyethylrhodanine; or 3-carboxyarylrhodanines such as 3-carboxyphenylrhodanine;

(7) 2-thio-2,4-oxazolidinedione (2-thio-2,4-(3H,5H)-oxazoledione) nucleus, for example, 2-ethyl-2-thio-2,4-oxazolidinedione;

(8) thianaphthenone nucleus, for example, 3(2H)-thianaphthenone or 3(2H)-thianaphthenone-1,1-dioxide;

(9) 2-thio-2,5-thiazolidinedione nucleus, for example, 3-ethyl-2-thio-2,5-thiazolidinedione;

(10) 2,4-thiazolidinedione nucleus, for example, 2,4-thiazolidinedione, 3-ethyl-2,4-thiazolidinedione, or 3-phenyl-2,4-thiazolidinedione;

(11) thiazolidinone nucleus, for example, 4-thiazolidinone or 3-ethyl-4-thiazolidinone;

(12) 4-thiazolinone nucleus, for example, 2-ethylmercapto-5-thiazolin-4-one or 2-alkylphenylamino-5-thiazolin-4-one;

(13) 2-imino-2-oxozolin-4-one (pseudo-hydantoin) nucleus;

(14) 2,4-imidazolidinedione (hydantoin) nucleus, for example, 2,4-imidazolidinedione or 3-ethyl-2,4-imidazolidinedione;

(15) 2-thio-2,4-imidazolidinedione (2-thiohydantoin) nucleus, for example, 2-thio-2,4-imidazolidinedione or 3-ethyl-2-thio-2,4-imidazolidinedione;

(16) 2-imidazolin-5-one nucleus, for example, 2-n-propylmercapto-2-imidazolin-5-one;

(17) furan-5-one;

(18) 4-hydroxy-2(1H)-quinolinone nucleus or 4-hydroxy-2(1H)-pyridinone nucleus, for example, N-methyl-4-hydroxy-2(1H)-quinolinone, N-n-butyl-4-hydroxy-2(1H)-quinolinone, or N-methyl-4-hydroxy-2(1H)-pyridinone;

(19) substituted or unsubstituted 4-hydroxy-2H-pyran-2-one, or 4-hydroxycoumarin; and

(20) substituted or unsubstituted thioindoxyl, for example, 5-methylthioindoxyl.

Among those used as the acidic nucleus, (1) 1,3-dicarbonyl nucleus, (2) pyrazolinone nucleus, (5) 2,4,6-triketohexahydropyrimidine nucleus, (6) 2-thio-2,4-thiazolidinedione nucleus, and (7) 2-thio-2,4-oxazolidinedione (2-thio-2,4-(3H,5H)-oxazoledione) nucleus are preferable; and (5) 2,4,6-triketohexahydropyrimidine nucleus represented by barbituric acid or 2-thiobarbituric acid and a derivative thereof are particularly preferable.

When $G^{b1}$ and $G^{b2}$ in the compound of Formula (2) are bonded to each other to form a ring, Formula (2) has a structure of Formula (2-a).

(Component B) is preferably a compound represented by the following Formula (2-a).

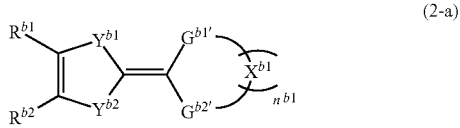

(2-a)

wherein, in Formula (2-a), $G^{b1'}$ and $G^{b2'}$ each represent a residue obtained by eliminating one hydrogen atom from $G^{b1}$ and $G^{b2}$; $X^{b1}$ represents a single bond, —C(=O)—, —C(=S)—, —NR$^{12}$— (wherein R$^{12}$ represents a hydrogen atom, an alkyl group, or an aryl group), —N=CR$^{13}$— (wherein R$^{13}$ represents a hydrogen atom, an alkyl group, or an aryl group), —O—, or —S—, and a plurality of $X^{b1}$s may be identical to or different from each other; and $n^{b1}$ represents an integer of 1 or greater.

The details of $R^{b1}$, $R^{b2}$, $Y^{b1}$ and $Y^{b2}$ are the same as the details of $R^{b1}$, $R^{b2}$, $Y^{b1}$ and $Y^{b2}$ in Formula (2).

At least one of $R^{b1}$, $R^{b2}$, $Y^{b1}$, $Y^{b2}$, $G^{b1'}$, $G^{b2'}$, and $X^{b1}$ is substituted with at least one hydrophilic group.

$n^{b1}$ represents an integer of 1 or greater, and is preferably an integer from 1 to 4, and more preferably an integer from 1 to 2.

Among the compounds represented by Formula (2), preferable compounds can be represented by the following Formula (2-b):

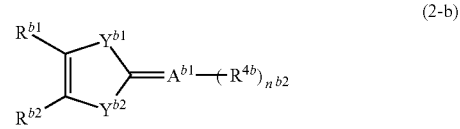

(2-b)

wherein, in Formula (2-b), $A^{b1}$ represents a residue obtained by eliminating $(2+n^{b2})$ hydrogen atoms from a compound having a hydrocarbon ring or a compound having a heterocyclic ring; $R^{4b}$ represents a hydrogen atom, an alkyl group, or an aryl group, and when there are plural $R^{4b}$'s, each $R^{4b}$ may be identical to or different from another $R^{4b}$; $n^{b2}$ represents an integer of 0 or greater, provided that the double bond linking $A^{b1}$ and the 5-membered ring in Formula (2-b) is bonded to a carbon atom in $A^{b1}$; and at least one of $R^{b1}$, $R^{b2}$, $Y^{b1}$, $Y^{b2}$, $A^{b1}$, and $R^{4b}$ is substituted with at least one hydrophilic group.

The compound having a hydrocarbon ring for $A^{b1}$ has at least a hydrocarbon ring, and examples thereof include a compound having a monocyclic hydrocarbon ring, a compound in which a hydrocarbon ring and a hydrocarbon ring are condensed, and a compound in which a heterocyclic ring and a hydrocarbon ring are condensed.

The compound having a heterocyclic ring for $A^{b1}$ has at least a heterocyclic ring, and examples thereof include a compound having a monocyclic heterocyclic ring, a compound in which a hydrocarbon ring and a heterocyclic ring are condensed, and a compound in which a heterocyclic ring and a heterocyclic ring are condensed.

Specific examples of the compound having a hydrocarbon ring or the compound having a heterocyclic ring include those compounds that are generally used as an acidic nucleus in merocyanine dye as described above.

The number of carbon atoms in the case in which $R^{4b}$ is an alkyl group is preferably 1 to 8, and more preferably 1 to 4.

The number of carbon atoms in the case in which $R^{4b}$ is an aryl group is preferably 6 to 14, and more preferably 6 to 10.

The alkyl group and aryl group for $R^{4b}$ may or may not have a substituent.

$n^{b2}$ represents an integer of 0 or greater, preferably an integer of from 0 to 4, and more preferably an integer of from 0 to 2.

Formula (2) is more preferably the following Formula (2-c):

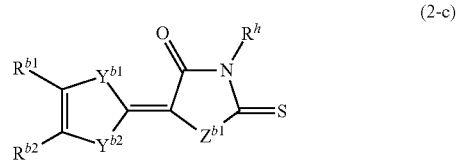

(2-c)

wherein, in Formula (2-c), $Z^{b1}$ represents —CONR$^i$—, —NR$^i$—, —O—, or —S—; R$^i$ represents a hydrogen atom, an alkyl group, or an aryl group; R$^h$ represents a hydrogen atom, an alkyl group, or an aryl group; $R^{b1}$, $R^{b2}$, $Y^{b1}$, and $Y^{b2}$ have the same definitions as $R^{b1}$, $R^{b2}$, $Y^{b1}$ and $Y^{b2}$ in Formula (2), respectively; and at least one of $R^{b1}$, $R^{b2}$, $Y^{b1}$, $Y^{b2}$, $Z^{b1}$, and R$^h$ is substituted with at least one hydrophilic group.

The number of carbon atoms in the case in which R$^i$ is an alkyl group is preferably 1 to 8, and more preferably 2 to 4.

The number of carbon atoms in the case in which R$^i$ is an aryl group is preferably 6 to 14, and more preferably 6 to 10.

The alkyl group and aryl group for R$^i$ may or may not have a substituent.

The number of carbon atoms in the case in which R$^h$ is an alkyl group is preferably 1 to 8, and more preferably 2 to 4.

The number of carbon atoms in the case in which R$^h$ is an aryl group is preferably 6 to 14 carbon atoms, and more preferably 6 to 10.

The alkyl group and aryl group for R$^h$ may or may not have a substituent.

In Formula (2), at least one of $R^{b1}$, $R^{b2}$, $Y^{b1}$, $Y^{b2}$, $G^{b1}$, and $G^{b2}$ is substituted with at least one hydrophilic group. Examples of the hydrophilic group of Formula (2) include at least one group selected from the group consisting of —COOH, —NHSO$_2$R$^4$, —CONHCOR$^4$, or —CONHSO$_2$R$^4$ (wherein R$^4$ represents an alkyl group, an aryl group, or an aralkyl group), and a salt thereof, and the hydrophilic group is more preferably —COOH or a salt thereof, and a particularly preferable aspect may be, for example, a salt of —COOH.

The hydrophilic group in the case in which $G^{b1\prime}$, $G^{b2\prime}$, and $X^{b1}$ in Formula (2-a), $A^{b1}$ and $R^b$ in Formula (2-b), and $Z^{b1}$ and $R^h$ in Formula (2-c) have hydrophilic groups, is also preferably the hydrophilic group for Formula (2), including preferable ranges.

Examples of a counter cation in the case in which the hydrophilic group of Formula (2) forms a salt include an alkali metal or onium ion, and an alkali metal is preferable. Specific examples thereof include a lithium atom, a sodium atom, a potassium atom, and an ammonium ion.

The compound represented by Formula (2) that can be used in the invention can be synthesized using a known method. Synthesis can be carried out with reference to a representative synthesis method, for example, "The Theory of Photographic Process," 4th Edition, Macmillan Co., New York (1977), edited by T. H. James; "The Cyanine Dyes and Related Compounds," John Wiley & Sons Co., New York (1964), written by F. M. Hamer; or JP-A No. 61-203443.

Specific examples of the compound represented by Formula (2) that can be used in the invention include the following compounds, but the invention is not limited to these.

(2-1)
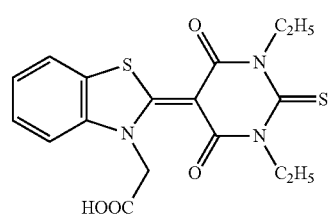

(2-2)
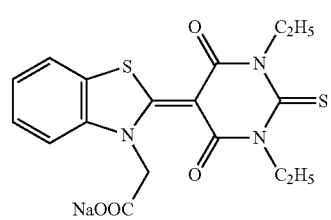

(2-3)
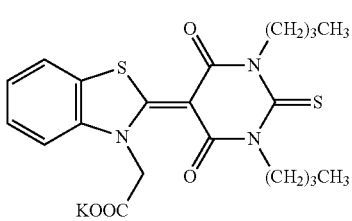

(2-4)
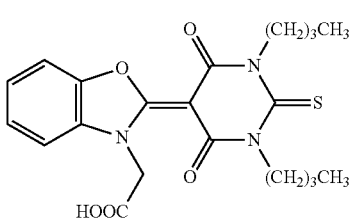

(2-5)
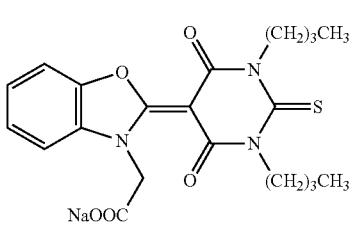

(2-6)
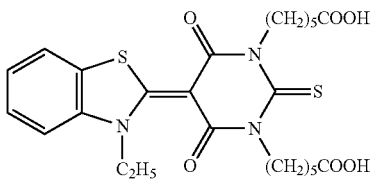

(2-7)
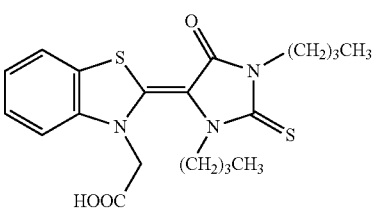

(2-8)
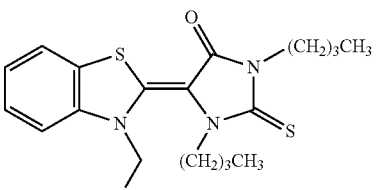

(2-9)
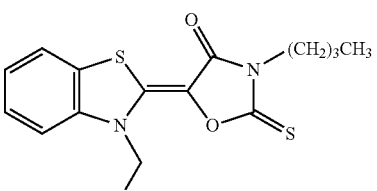

(2-10)
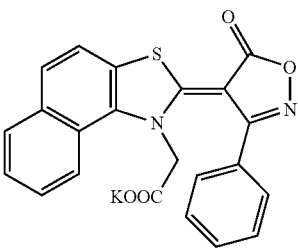

(2-11)
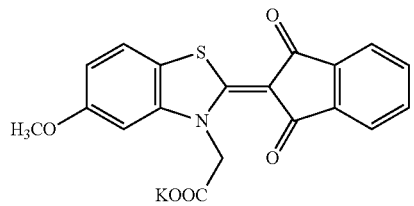

(2-12)
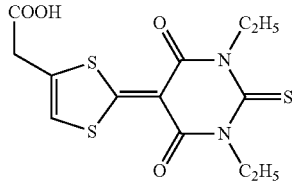

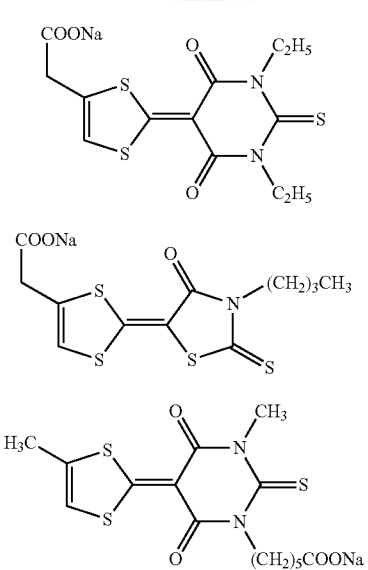

The content of (Component B) in the ink composition is preferably from 0.1% to 20% by mass, more preferably from 0.3% to 15% by mass, and even more preferably from 0.5% to 10% by mass, with respect to the ink composition.

<(Component C) Coloring Material>

The ink composition according to the invention contains (Component C) a coloring material.

The coloring material that can be used in the invention is not particularly limited, and any material arbitrarily selected from known colorants such as a pigment, a water-soluble dye, and a disperse dye can be used. Among these, it is more preferable that the ink composition include a pigment, from the viewpoint of having excellent weather resistance and rich color reproducibility, as a coloring material.

(Pigment)

The pigment is not particularly limited and can be appropriately selected according to the purpose, and examples thereof include known organic pigments and inorganic pigments. Further examples include resin particles dyed with dyes, commercially available pigment dispersions, and surface-treated pigments (for example, a pigment dispersed in a dispersing media such as a water, a liquid organic compound, an insoluble resin or the like; and a pigment surface-treated with a resins, a pigment derivatives, or the like). In addition, examples of the pigment include such as those described in "Ganryo no Jiten (Dictionary of Pigments)", edited by Seijiro Ito (2000, published by Asakura Publishing Co., Ltd.); "Yuki Ganryo Handbook (Organic Pigment Handbook)", written by Isao Hashimoto (2006, published by Color Office Co., Ltd.); "Industrial organic Pigments", edited by W. Herbst and K. Hunger (1992, published by Wiley-VCH Verlag GmbH & Co. KGaA); JP-A No. 2002-12607, JP-A No. 2002-188025, JP-A No. 2003-26978, JP-A No. 2003-342503, and JP-A No. 2009-235370.

Examples of the organic pigment and inorganic pigment include a yellow pigment, a red pigment, a magenta pigment, a blue pigment, a cyan pigment, a green pigment, an orange pigment, a violet pigment, a brown pigment, a black pigment, and a white pigment.

Preferable examples of the yellow pigment include monoazo pigments such as C.I. Pigment Yellow 1, 2, 3, 4, 5, 10, 65, 73, 74, 75, 97, 98, 111, 116, 130, 167, and 205; monoazo lake pigments such as C.I. Pigment Yellow 61, 62, 100, 168, 169, 183, 191, 206, 209, and 212; disazo pigments such as C.I. Pigment Yellow 12, 13, 14, 16, 17, 55, 63, 77, 81, 83, 106, 124, 126, 127, 152, 155, 170, 172, 174, 176, 214, and 219; anthraquinone pigments such as C.I. Pigment Yellow 24, 99, 108, 193, and 199; monoazopyrazolone pigments such as C.I. Pigment Yellow 60; condensed azo pigments such as C.I. Pigment Yellow 93, 95, 128, and 166; isoindoline pigments such as C.I. Pigment Yellow 109, 110, 139, 173, and 185; benzimidazolone pigments such as C.I. Pigment Yellow 120, 151, 154, 175, 180, 181, and 194; azomethine metal complex pigments such as C.I. Pigment Yellow 117, 129, 150, and 153; quinophthalone pigments such as C.I. Pigment Yellow 138; and quinoxaline pigments such as C.I. Pigment Yellow 213.

Preferable examples of the red or magenta pigment include monoazo lake pigments such as C.I. Pigment Red 193; disazo pigments such as C.I. Pigment Red 38; naphthol AS pigments such as C.I. Pigment Red 2, 5, 8, 9, 10, 11, 12, 14, 15, 16, 17, 18, 22, 23, 31, 32, 112, 114, 146, 147, 150, 170, 184, 187, 188, 210, 213, 238, 245, 253, 256, 258, 266, 268, and 269; β-naphthol pigments such as C.I. Pigment Red 3, 4, and 6; β-naphthol lake pigments such as C.I. Pigment Red 49, 53, and 68; naphthol AS lake pigments such as C.I. Pigment Red 237, 239, and 247; pyrazolone pigments such as C.I. Pigment Red 41; BONA lake pigments such as C.I. Pigment Red 48, 52, 57, 58, 63, 64:1, and 200; xanthene lake pigments such as C.I. Pigment Red 81:1, 169, and 172; thioindigo pigments such as C.I. Pigment Red 88, 181, and 279; perylene pigments such as C.I. Pigment Red 123, 149, 178, 179, 190, and 224; condensed azo pigments such as C.I. Pigment Red 144, 166, 214, 220, 221, 242, and 262; anthraquinone pigments such as C.I. Pigment Red 168, 177, 182, 226, and 263; anthraquinone lake pigments such as C.I. Pigment Red 83; benzimidazolone pigments such as C.I. Pigment Red 171, 175, 176, 185, and 208; quinacridone pigments such as C.I. Pigment Red 122, 202 (including a mixture with C.I. Pigment Violet 19), 207, and 209; diketopyrrolopyrrole pigments such as C.I. Pigment Red 254, 255, 264, 270, and 272; and azomethine metal complex pigments such as C.I. Pigment Red 257 and 271.

Preferable examples of the blue or cyan pigment include naphthol AS pigments such as C.I. Pigment Blue 25 and 26; phthalocyanine pigments such as C.I. Pigment Blue 15, 15:1, 15:2, 15:3, 15:4, 15:6, 16, 17:1, 75, and 79; dye lake pigments such as C.I. Pigment Blue 1, 24:1, 56, 61, and 62; anthraquinone-based pigments such as C.I. Pigment Blue 60; indigo pigments such as C.I. Pigment Blue 63; and dioxazine pigments such as C.I. Pigment Blue 80.

Preferable examples of the green pigment include dye lake pigments such as C.I. Pigment Green 1 and 4; phthalocyanine pigments such as C.I. Pigment Green 7 and 36; and azomethine metal complex pigments such as C.I. Pigment Green 8.

Preferable examples of the orange pigment include monoazo pigments such as C.I. Pigment Orange 1; β-naphthol pigments such as C.I. Pigment Orange 2, 3, and 5; naphthol AS pigments such as C.I. Pigment Orange 4, 24, 38, and 74; pyrazolone pigments such as C.I. Pigment Orange 13 and 34; benzimidazolone pigments such as C.I. Pigment Orange 36, 60, 62, 64, and 72; disazo pigments such as C.I. Pigment Orange 15 and 16; β-naphthol lake pigments such as C.I. Pigment Orange 17 and 46; naphthalenesulfonic acid lake pigments such as C.I. Pigment Orange 19; perinone pigments such as C.I. Pigment Orange 43; quinacridone pigments such as C.I. Pigment Orange 48 and 49; anthraquinone-based pigments such as C.I. Pigment Orange 51; isoindolinone pigments such as C.I. Pigment Orange 61; isoindoline-based pigments such as C.I. Pigment Orange 66; azomethine metal complex pigments such as C.I. Pigment Orange 68; and diketopyrrolopyrrole pigments such as C.I. Pigment Orange 71, 73, and 81.

Preferable examples of the brown pigment include BONA lake pigments such as C.I. Pigment Brown 5; condensed azo pigments such as C.I. Pigment Brown 23, 41, and 42; and benzimidazolone pigments such as C.I. Pigment Brown 25 and 32.

Preferable examples of the violet pigment include dye lake pigments such as C.I. Pigment Violet 1, 2, 3, and 27; naphthol AS pigments such as C.I. Pigment Violet 13, 17, 25, and 50; anthraquinone lake pigments such as C.I. Pigment Violet 5:1; quinacridone pigments such as C.I. Pigment Violet 19; dioxazine pigments such as C.I. Pigment Violet 23 and 37; perylene pigments such as C.I. Pigment Violet 29; benzimidazolone pigments such as C.I. Pigment Violet 32; and thioindigo pigments such as C.I. Pigment Violet 38.

Preferable examples of the black pigment include indazine pigments such as C.I. Pigment Black 1; carbon black which is C.I. Pigment Black 7; graphite which is C.I. Pigment Black 10; magnetite which is C.I. Pigment Black 11; anthraquinone pigments such as C.I. Pigment Black 20; and perylene pigments such as C.I. Pigment Black 31 and 32.

Preferable examples of the white pigment include zinc oxide which is C.I. Pigment White 4; titanium oxide which is C.I. Pigment White 6; zinc sulfide which is C.I. Pigment White 7; zirconium oxide (zirconium white) which is C.I. Pigment White 12; calcium carbonate which is C.I. Pigment White 18; aluminum oxide-silicon oxide (kaolin clay) which is C.I. Pigment White 19; barium sulfate which is C.I. Pigment White 21 or 22; aluminum hydroxide (alumina white) which is C.I. Pigment White 23; silicon oxide which is C.I. Pigment White 27; and calcium silicate which is C.I. Pigment White 28.

The inorganic particles used as the white pigment may be particles of a simple substance, or may be composite particles with an oxide of silicon, aluminum, zirconium, titanium or the like, an organometallic compound, or an organic compound.

Among them, titanium oxide is suitably used since titanium oxide has a smaller specific gravity, a large refractive index, higher masking power or coloring power, and superior durability to acids, alkalis and other environments, compared to other white pigments. In addition to the titanium oxide, other white pigments (white pigments other than those white pigments described above may also be used) may also be used in combination.

In regard to the volume average particle size of the pigment particles, it is preferable to select the pigment, dispersant and medium and to set the dispersing condition and filtering condition such that the volume average particle size is preferably from 0.005 μm to 0.5 μm, more preferably from 0.01 μm to 0.45 μm, and even more preferably from 0.015 μm to 0.4 μm.

In the invention, the average particle size and the particle size distribution of the particles are determined by measuring the volume average particle size by a dynamic light scattering method, by using a commercially available particle size analyzer such as NanoTrack particle size distribution analyzer, UPA-EX150 (manufactured by Nikkiso Co., Ltd.).

(Water-Soluble Dye)

Examples of the water-soluble dye that can be used in the invention include an acidic dye and a direct dye. The acidic dye and direct dye each have a structure having an acidic group as a solubilizing group. Examples of the acidic group include a sulfonic acid group and salts thereof, a carboxylic acid group and salts thereof, a phosphoric acid group and salts thereof. The number of the acidic group may be one or plural, and a combination of two or more groups may also be used. Examples of the chemical structure of the chromophore contained in the water-soluble dye include azo-based, phthalocyanine-based, triphenylmethane-based, xanthene-based, pyrazolone-based, nitro-based, stilbene-based, quinoline-based, methine-based, thiazole-based, quinonimine-based, indigoid-based, rhodamine-based, anthraquinone-based, and anthraquinone-based structures.

Although an oil-soluble dye is not limited to the following, preferable specific examples of the oil-soluble dye include C.I. Acid Yellow 19, C.I. Acid Red 37, C.I. Acid Blue 62, C.I. Acid Orange 10, C.I. Acid Blue 83, C.I. Acid Black 01, C.I. Direct Yellow 44, C.I. Direct Yellow 142, C.I. Direct Yellow 12, C.I. Direct Blue 15, C.I. Direct Blue 25, C.I. Direct Blue 249, C.I. Direct Red 81, C.I. Direct Red 9, C.I. Direct Red 31, C.I. Direct Black 154, and C.I. Direct Black 17.

(Disperse Dye)

In the invention, a disperse dye may also be used.

Preferable specific examples of the disperse dye include C.I. Disperse Yellow 5, 42, 54, 64, 79, 82, 83, 93, 99, 100, 119, 122, 124, 126, 160, 184:1, 186, 198, 199, 201, 204, 224, and 237; C.I. Disperse Orange 13, 29, 31:1, 33, 49, 54, 55, 66, 73, 118, 119, and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and C.I. Disperse Green 6:1 and 9.

The colorant that can be used in the invention may be used singly, or two or more kinds may be used in combination.

The content of (Component C) in the ink composition can be appropriately selected based on the physical properties of the colorant (specific gravity, coloring power, color tint, and the like), and the conditions under which the number of colors of the ink composition is to be combined to produce printed matter; however, the content is preferably from 0.1% to 30% by mass, and more preferably from 0.5% to 20% by mass, with respect to the total mass of the ink composition.

(Dispersant)

In the case of using a pigment as the coloring material, a pigment dispersant may be used if necessary, when pigment particles are prepared. Examples of the pigment dispersant that can be used include activators such as higher fatty acid salts, alkyl sulfates, alkyl ester sulfates, alkylsulfonates, sulfosuccinates, naphthalenesulfonates, alkyl phosphates, polyoxyalkylene alkyl ether phosphates, polyoxyalkylene alkyl phenyl ether, polyoxyethylene polyoxypropylene glycol, glycerin esters, sorbitan esters, polyoxyethylene fatty acid amides, and amine oxides; and block copolymers and random copolymers formed from two or more monomers selected from styrene, a styrene derivative, a vinylnaphthalene derivative, acrylic acid, an acrylic acid derivative, maleic acid, a maleic acid derivative, itaconic acid, an itaconic acid derivative, fumaric acid, and a fumaric acid derivative, and a salt thereof.

Furthermore, a self-dispersing pigment may also be used in the ink composition according to the invention. The self-dispersing pigment as used in the invention refers to a pigment capable of being dispersed without a dispersant, and a particularly preferable example is pigment particles having a polar group at the surface.

The pigment particles having a polar group at the surface in the invention refer to a pigment which has been modified directly with a polar group at the surface of the pigment particles, or a pigment in which a polar group is bonded, directly or through a joint, to an organic substance having an organic pigment parent nucleus (hereinafter, referred to as a pigment derivative).

Examples of the polar group include a sulfonic acid group, a carboxylic acid group, a phosphoric acid group, a boric acid group, and a hydroxyl group, a sulfonic acid group and a carboxylic acid group are preferable, and a sulfonic acid group is more preferable.

Examples of a method of obtaining the pigment particles having a polar group at the surface include methods of introducing a polar group such as a sulfonic acid group or a salt thereof to at least a part of the surface of the pigment by oxidizing the pigment particle surface with an appropriate oxidizing agent, as described in WO 97/48769, JP-A No. 10-110129, JP-A No. 11-246807, JP-A No. 11-57458, JP-A No. 11-189739, JP-A No. 11-323232, and JP-A No. 2000-265094. Specifically, pigment particles can be produced by oxidizing carbon black with concentrated nitric acid, or in the case of a color pigment, oxidizing the color pigment with sulfamic acid, a sulfonated pyridine salt, an amide sulfuric acid or the like in sulfolane or N-methyl-2-pyrrolidone. When oxidization proceeds too quickly as a result of the reaction and the pigment particles become water-soluble, elimination and purification can be performed to obtain a pigment dispersion. Furthermore, when a sulfonic acid group is introduced to the surface by oxidation, the acidic group may be neutralized using a basic compound as necessary.

Other examples of the method of obtaining pigment particles having a polar group at the surface include a method of adsorbing a pigment derivative to the pigment particle surface by a treatment such as milling described in JP-A No. 11-49974, JP-A No. 2000-273383, JP-A No. 2000-303014; and a method of dissolving a pigment together with a pigment derivative in a solvent, and then precipitating crystals in a poor solvent described in JP-A No. 2000-377068, JP-A No. 2001-1495, and JP-A No. 2001-234966. By any of these methods, pigment particles having a polar group at the surface can be obtained without difficulty.

The polar group at the pigment surface may be in a free form or in a salt form, or may have a counter salt. Examples of the counter salt include inorganic salts (lithium, sodium, potassium, magnesium, calcium, aluminum, nickel, and ammonium), and organic salts (triethylammonium, diethylammonium, pyridinium, triethanolammonium, and the like), and a monovalent counter salt is preferable.

Regarding the method for dispersing a pigment, for example, various dispersing machines such as a ball mill, a sand mill, an attritor, a roll mill, an agitator, a Henschel mixer, a colloid mill, an ultrasonic homogenizer, a pearl mill, and a wet jet mill and a paint shaker, can be used. Furthermore, for the purpose of eliminating coarse particles of the pigment dispersion, it is also preferable to use a centrifuge apparatus or to use a filter.

In regard to a preferable addition amount of the dispersant in the ink composition, when the mass of the pigment in the ink composition is designated as P and the mass of the polymer dispersant in the ink composition is designated as D, the mass ratio (D/P) is preferably $0.01 \leq D/P \leq 2.0$, more preferably $0.03 \leq D/P \leq 1.5$, and even more preferably $0.05 \leq D/P \leq 0.6$.

Furthermore, at the time of dispersing, it is also preferable to add, in addition to the dispersant, a dispersing aid that is generally called as a synergist (for example, SOLSPERSE Series 5000, 12000, and 22000 that are commercially available from Lubrizol Corp.; and EFKA6745 that is commercially available from BASF Japan, Ltd., or the like), various surfactants, or a defoamant, to improve dispersibility and wettability of the pigment.

In the invention, when dispersing of a pigment is carried out, it is preferable that the pigment be mixed with a dispersant, and then the mixture be added to a polar organic solvent and dispersed therein, or it is preferable that a polar organic solvent be mixed with a dispersant, and then the pigment be added to the mixture and dispersed therein. For the dispersing process, various dispersing apparatuses such as a ball mill, a bead mill, a sand mill, a salt mill, an attritor, a roll mill, an agitator, a Henschel mixer, a colloid mill, an ultrasonic homogenizer, a pearl mill, a wet jet mill, a paint shaker, and the like may be used. Among them, a bead mill dispersing apparatus is preferable due to its excellent dispersing properties.

Regarding the beads that are used to perform bead mill dispersing, a pigment dispersion having excellent stability can be obtained by using beads having a volume average diameter of preferably from 0.01 mm to 3.0 mm, more preferably from 0.05 mm to 1.5 mm, and even more preferably from 0.1 mm to 1.0 mm.

<(Component D) Water>

The ink composition according to the invention contains (Component D) water.

As for water, it is preferable to use ion-exchanged water, distilled water or the like, which does not contain impurities.

The content of water in the ink composition in the invention is preferably from 10% to 97% by mass, more preferably from 30% to 95% by mass, and most preferably from 35% to 93% by mass, with respect to the ink composition.

<Other Additives>

In the ink composition according to the invention, known additives may be used in combination, in addition to the essential components, (Component A) to (Component D), to the extent that the effects of the invention are not impaired. Hereinafter, the additives that can be used in the ink composition are described.

((Component E) Water-Soluble Organic Solvent)

The ink composition according to the invention contains water, but depending on the purpose, it is preferable to further use a water-soluble organic solvent in combination in the solvent.

The water-soluble organic solvent as used herein means an organic solvent having a solubility in water at 25° C. of 10% by mass or higher.

Examples of the water-soluble organic solvent that can be used in the invention include:

alcohols (for example, methanol, ethanol, propanol, isopropanol, butanol, isobutanol, secondary butanol, tertiary butanol, pentanol, hexanol, cyclohexanol, and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, and 2-methylpropanediol), polyhydric alcohol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine), amides (for example, formamide, N,N-dimethylformamide, N,N-dimethylacetamide, and 3-methoxy-N,N-dimethylpropanamide), heterocyclic rings (for example, 2-pyrrolidone, N-methyl-2-pyrrolidone, cyclohexylpyrrolidone, 2-oxazolidone, 1,3-dimethyl-2-imidazolidinone, and γ-butyrolactone)

sulfoxides (for example, dimethyl sulfoxide),
sulfones (for example, sulfolane),
urea, acetonitrile, and acetone.

Preferable examples of the water-soluble organic solvent include polyhydric alcohol ethers, heterocyclic rings, and amides, and these are preferably used together in any arbitrary combination. Among the polyhydric alcohol ethers, so-called glycol ethers are preferable, and specifically, tripropylene glycol monomethyl ether, dipropylene glycol monomethyl ether, and dipropylene glycol dimethyl ether are preferable. Among the heterocyclic rings, 2-pyrrolidone, γ-butyrolactone and the like are preferable, and 2-pyrrolidone is particularly preferable. Among the amides, 3-methoxy-N,N-dimethylpropanamide is preferable. Particularly, a solvent having a high boiling point can be preferably used from the viewpoint of improving ejectability, and a solvent having a boiling point of 120° C. or higher is preferable, and a solvent having a boiling point of 150° C. or higher is more preferable, at an normal pressure.

The water-soluble organic solvents may be used singly or in combination of plural kinds. Regarding the addition amount the water-soluble organic solvent in the ink composition, the total amount is from 1% to 60% by mass, and preferably from 2% to 35% by mass.

When the ink composition contains a water-soluble organic solvent as (Component E) in the invention, the content ratio (on a mass basis) of (Component D) and (Component E) is preferably (Component D):(Component E)=1:0.1 to 1:10, more preferably 1:0.2 to 1:5, even more preferably 1:0.2 to 1:2, and most preferably 1:03 to 1:1.

(Surfactant)

The ink composition according to the invention may contain a surfactant. Examples of the surfactant that is preferably used include anionic surfactants such as dialkyl sulfosuccinates, alkyl naphthalenesulfonates, and fatty acid salts; nonionic surfactants such as polyoxyethylene alkyl ethers, polyoxyethylene alkyl aryl ethers, acetylene glycols, and polyoxyethylene-polyoxypropylene block copolymers; and cationic surfactants such as alkylamine salts and quaternary ammonium salts. Particularly, anionic surfactants and non-ionic surfactants can be preferably used.

Furthermore, in the invention, polymeric surfactants may also be used, and preferable examples of the polymeric surfactant include the following water-soluble resins, from the viewpoint of ejection stability. Examples of the water-soluble resin that is preferably used include a styrene-acrylic acid-acrylic acid alkyl ester copolymer, a styrene-acrylic acid copolymer, a styrene-maleic acid-acrylic acid alkyl ester copolymer, a styrene-maleic acid copolymer, a styrene-methacrylic acid-acrylic acid alkyl ester copolymer, a styrene-methacrylic acid copolymer, a styrene-maleic acid half ester copolymer, a vinylnaphthalene-acrylic acid copolymer, and a vinylnaphthalene-maleic acid copolymer.

(Latex)

The ink composition according to the invention may contain a latex. Examples of the latex that can be used in the invention include latices such as a styrene-butadiene copolymer, polystyrene, an acrylonitrile-butadiene copolymer, an acrylic acid ester copolymer, polyurethane, a silicone-acrylic copolymer, and an acryl-modified fluororesin. The latex may be a latex obtained by dispersing polymer particles using an emulsifier, or may be a so-called soap-free latex obtained by dispersing polymer particles without using an emulsifier. As the emulsifier, surfactants are frequently used, but it is also preferable to use a polymer having a group soluble in water such as a sulfonic acid group or a carboxylic acid group (for example, a polymer in which a solubilizing group is graft-bonded, or a polymer obtained from a monomer having a solubilizing group and a monomer having an insoluble moiety).

The volume average particle size of the polymer particles in the latex that is used in the ink composition in the invention is preferably from 10 nm to 300 nm, and more preferably from 10 nm to 100 nm. When the average particle size of the latex in the ink composition is in the above-described range, an improvement of the glossiness of an image, and an improvement of water resistance and abrasion resistance can be achieved. The average particle size of the polymer particles in the latex can be determined using a commercially available particle size analyzer which uses a light scattering method, an electrophoretic method, or a laser Doppler method.

In the case of using a latex in the ink composition in the invention, the addition amount of the latex is preferably from 0.1% by mass to 20% by mass in terms of solids content, and particularly preferably from 0.5% by mass to 10% by mass in terms of solids content.

(Aqueous Polymer)

The ink composition according to the invention may contain an aqueous polymer that is different from (Component A).

Preferable examples of the aqueous polymer include natural polymers, and specific examples thereof include proteins such as animal glue, gelatin, casein, and albumin; natural rubbers such as gum arabic and tragacanth; glucosides such as saponin; alginic acid and alginic acid derivatives such as alginic acid propylene glycol esters, triethanolamine alginate, and ammonium alginate; and cellulose derivatives such as methyl cellulose, carboxymethyl cellulose, hydroxyethyl cellulose, and ethylhydroxyl cellulose.

Other preferable examples of the aqueous polymer include synthetic polymers, and examples thereof include polyvinyl alcohols; polyvinylpyrrolidones; acrylic resins such as polyacrylic acid, an acrylic acid-acrylonitrile copolymer, a potassium acrylate-acrylonitrile copolymer, a vinyl acetate-acrylic acid ester copolymer, and an acrylic acid-acrylic acid ester copolymer; styrene-acrylic acid resins such as a styrene-acrylic acid copolymer, a styrene-methacrylic acid copolymer, a styrene-methacrylic acid-acrylic acid ester copolymer, a styrene-α-methylstyrene-acrylic acid copolymer, and a styrene-α-methylstyrene-acrylic acid-acrylic acid ester copolymer; a styrene-maleic acid copolymer, a styrene-maleic anhydride copolymer, a vinylnaphthalene-acrylic acid copolymer, a vinylnaphthalene-maleic acid copolymer; and vinyl acetate-based copolymers such as a vinyl acetate-ethylene copolymer, a vinyl acetate-fatty acid vinylethylene copolymer, a vinyl acetate-maleic acid ester copolymer, a vinyl acetate-crotonic acid copolymer, and a vinyl acetate-acrylic acid copolymer; and salts thereof. Among these, particularly preferable examples include polyvinylpyrrolidones.

The molecular weight of the water-soluble polymer that can be used in the invention is preferably from 1,000 to 200,000, and more preferably from 3,000 to 20,000.

The addition amount of the water-soluble polymer is preferably from 10% by mass to 1,000% by mass, and more preferably from 50% by mass to 200% by mass, with respect to the dissolved pigment.

(Polymerization Initiator)

The ink composition according to the invention may contain a polymerization initiator to the extent that the effect of the invention is not impaired. The polymerization initiator is preferably water-soluble, and regarding the degree of water-solubility, it is preferable that the polymerization initiator dissolve in distilled water at 25° C. in an amount of 0.5% by mass or more, more preferably in an amount of 1% by mass or more, and particularly preferably in an amount of 3% by mass or more.

Furthermore, it is preferable to use a polymerization initiator selected from the group consisting of α-aminoketones and acylphosphine oxides.

Examples of compounds included in the α-aminoketones include 2-methyl-1-phenyl-2-morpholinopropan-1-one, 2-methyl-1-[4-(hexyl)phenyl]-2-morpholinopropan-1-one, and 2-ethyl-2-dimethylamino-1-(4-morpholinophenyl)-butanon-1. Furthermore, polymerization initiators are available as commercially available products such as IRGACURE series manufactured by BASF Japan, Ltd., for example, IRGACURE 907, IRGACURE 369 and IRGACURE 379, and these are also compounds included in the α-aminoketones and can be suitably used in the invention.

Examples of compounds that are included in the acylphosphine oxides include [2,4,6-trimethylbenzoyl-diphenyl-phosphine oxide] which is available under trade name of DAROCUR TPO (manufactuerd by BASF Japan, Ltd.), and [bis(2,4,6-trimethylbenzoyl)-phenylphosphine oxide] which is available under trade name of IRGACURE 819 (manufactured by BASF Japan, Ltd.).

In the ink composition according to the invention, the above-described acylphosphine oxides are preferable as polymerization initiators, but other polymerization initiators may also be used to the extent that the effect of the invention is not impaired. Furthermore, the other polymerization initiators can also be used in combination with acylphosphine oxides. In this case, it is preferable to use a water-soluble polymerization initiator. Regarding water-solubility, it is preferable that the water-soluble polymerization initiator dissolves in distilled water at 25° C. in an amount of 0.5% by mass or more, more preferably in an amount of 1% by mass or more, and particularly preferably in an amount of 3% by mass or more.

Examples of other known polymerization initiators include camphor-quinone, benzophenone, benzophenone derivatives, acetophenone, acetophenone derivatives, for example, α-hydroxycycloalkyl phenyl ketones or 2-hydroxy-2-methyl-1-phenylpropanone; dialkoxyacetophenones, α-hydroxy- or 4-aroyl-1,3-dioxolanes, benzoin alkyl ethers, and benzyl ketals, for example, benzyl dimethyl ketal, phenyl glyoxalate and derivatives thereof, dimer phenyl glyoxalate; peresters, for example, benzophenone tetracarboxylic acid peresters (for example, such as those described in EP 1126, 541); halomethyltriazines, for example, 2-[2-(4-methoxyphenyl)vinyl]-4,6-bis-trichloromethyl[1,3,5]triazine, 2-(4-methoxyphenyl)-4,6-bis-trichloromethyl[1,3,5]triazine, 2-(3,4-dimethoxyphenyl)-4,6-bis-trichloromethyl[1,3,5]triazine, 2-methyl-4,6-bis-trichloromethyl[1,3,5]triazine; hexaarylbisimidazole/co-initiator systems, for example, ortho-chlorohexaphenyl-bisimidazole combined with 2-mercaptobenzothiazole; ferrocenium compounds or titanocenes, for example, dicyclopentadienylbis(2,6-difluoro-3-pyrrolophenyl)titanium; for example, mixtures with O-acyloxime ester compounds described in, for example, GB 2,339,571, can also be used. As a co-initiator, a boric acid compound can be used.

Regarding the content of the polymerization initiator in the ink composition according to the invention, the polymerization initiator is suitably contained at an amount in the range of preferably from 0 parts by mass to 10 parts by mass, more preferably from 0 parts by mass to 5 parts by mass, and even more preferably from 0 parts by mass to 3 parts by mass, with respect to 100 parts by mass of the ink composition. The content of the polymerization initiator means the total content of polymerization initiators.

(Sensitizing Dye)

The ink composition according to the invention may contain a sensitizing dye that is different from (Component B). In the invention, a known sensitizing dye can be used in combination, and from the viewpoint of improving curability at the time of irradiating an active energy ray, it is preferable to use a sensitizing dye in combination. Regarding solubility, it is preferable that the sensitizing dye dissolve in distilled water at room temperature in an amount of 0.5% by mass or more, more preferably in an amount of 1% by mass or more, and particularly preferably in an amount of 3% by mass or more.

Examples of the known sensitizing dye that can be used in combination include benzophenone, thioxanthone, particularly isopropylthioxanthone, anthraquinone and 3-acylcoumarin derivatives, terphenyl, styryl ketone and 3-(aroylmethylene)thiazoline, camphorquinone, eosine, rhodamine, and erythrosine.

(Polymerizable Compound)

The ink composition according to the invention may contain a polymerizable compound. The polymerizable compound may be any water-soluble compound as long as the water-soluble compound has at least one radical-polymerizable, ethylenically unsaturated bond in the molecule thereof, and examples thereof include a compound having chemical form such as a monomer, an oligomer or a polymer. Only one kind of the particular polymerizable compound may be used alone, or two or more kinds may also be used in combination at an arbitrary ratio in order to improve the intended characteristics. It is preferable to use two or more kinds in combination in view of adjusting the performance such as reactivity and physical properties.

The polymerizable compound that is used in the invention is a compound which dissolves in distilled water at room temperature in an amount of at least 2% by mass or more, and preferably in an amount of 15% by mass or more, and a polymerizable compound which is uniformly miscible with water at arbitrary ratio is particularly preferable.

Examples of the polymerizable compound include unsaturated carboxylic acids such as acrylic acid, methacrylic acid, itaconic acid, crotonic acid, isocrotonic acid and maleic acid, and esters thereof, and salts thereof; anhydrides having an ethylenically unsaturated group; acrylonitrile; styrene; and various unsaturated polyesters, unsaturated polyethers, unsaturated polyamides, unsaturated urethanes, vinyl ethers, and allyl ethers. Acrylic acid, methacrylic acid, esters thereof and salts thereof are preferable.

The polymerizable compound that can be used in the invention preferably has a poly(ethyleneoxy) chain, a poly(propyleneoxy) chain, or an ionic group (for example, a carboxyl group or a sulfo group) in order to impart water-solubility. When the polymerizable compound has a poly(ethyleneoxy) chain or a poly(propyleneoxy) chain, the number of the ethyleneoxy unit or propyleneoxy unit is preferably in the range of from 1 to 10, and more preferably in the range of from 1 to 5.

In order to further ameliorate sensitivity, bleeding, and adhesiveness to recording media, it is preferable to use a monoacrylate in combination with a polyfunctional acrylate monomer or polyfunctional acrylate oligomer, having a molecular weight of 400 or greater, and preferably 500 or greater, as radical polymerizable compounds. Particularly, in an ink composition that is used for recording on a flexible recording medium such as a PET film or a PP film, it is preferable to use a monoacrylate selected from the above-described compound groups in combination with a polyfunctional acrylate monomer or a polyfunctional acrylate oligomer, since flexibility is imparted to the film, film strength is improved and adhesiveness is improved.

Furthermore, an aspect of using at least three kinds of polymerizable compounds in combination, namely, a monofunctional monomer, a bifunctional monomer and a polyfunctional monomer having a functionality of 3 or higher, is preferable from the viewpoint that sensitivity, bleeding, and adhesiveness to recording media can be further ameliorated and safety is maintained.

In the ink according to the invention, in addition to the above-described various constituent elements, various known additives, for example, a viscosity adjusting agent, a surface tension adjusting agent, an antiseptic agent, a specific resistance adjusting agent, a film forming agent, a dispersant, a surfactant, an ultraviolet absorber, an oxidation inhibitor, a discoloration preventing agent, an antifungal agent, an anti-rusting agent, a solid wetting agent, silica fine particles, and the like may be appropriately selected and used as necessary, in accordance with the purpose of improving ejection stability, suitability to print heads or ink cartridges, storage stability, image preservability, and other general performance. Examples thereof include liquid paraffin, dioctyl phthalate, tricresyl phosphate, oil droplet fine particles such as silicone oil or the like; ultraviolet absorbers described in JP-A No. 57-74193, JP-A No. 57-87988 and JP-A No. 62-261476; discoloration preventing agents described in JP-A No. 57-74192, JP-A No. 57-87989, JP-A No. 60-72785, JP-A No. 61-146591, JP-A No. 1-95091, JP-A No. 3-13376, and the like; fluorescent brightening agents described in JP-A No. 59-42993, JP-A No. 59-52689, JP-A No. 62-280069, JP-A No. 61-242871, JP-A No. 4-219266, and the like; and pH adjusting agents such as sulfuric acid, phosphoric acid, citric acid, sodium hydroxide, potassium hydroxide, and potassium carbonate.

<Method of Preparing Ink Composition>

There are no particular limitations on the method of preparing the ink composition according to the invention, and various components are stirred, mixed, and dispersed using a container-driven medium mill such as a ball mill, a centrifugal mill, or a planetary ball mill; a high speed rotating mill such as a sand mill; a medium stirring mill such as a stirring tank mill; or a simple dispersing machine such as Disper, to prepare the ink composition. The order of adding the various components is arbitrary. Furthermore, in order to further micronize dispersed particles, mixing may be carried out using a dispersing machine such as a bead mill or a high pressure jet mill. Also, depending on the type of the pigment or the polymeric dispersant, an anionic resin may also be added at the time of premixing before the dispersing of pigment.

The ink composition according to the invention preferably has a surface tension at 25° C. of from 20 mN/m to 40 mN/m. The surface tension is measured using Automatic Surface Tensiometer CBVP-Z (manufactured by Kyowa Interface Science Co., Ltd.) under the conditions of 25° C. Furthermore, the viscosity is preferably from 1 mPa·s to 40 mPa·s, and more preferably from 3 mPa·s to 30 mPa·s. The viscosity of the ink composition is measured by using a commercial viscometer such as VISCOMATE VM-10A-L (manufactured by CMC Materials Co., Ltd.) or VISCOMETER TV-22 (manufactured by Toki Sangyo Co., Ltd.) under the conditions of 25° C.

<<Image Forming Method>>

The image forming method according to the invention includes an ink application process of applying the ink composition onto a recording medium, and an irradiation process of irradiating the ink composition with an active energy ray. When these processes are carried out, an image in which an ink composition is fixed onto a recording medium is formed.

<Ink Application Process>

Hereinafter, the ink application process in the image forming method according to the invention is described. The ink application process according to the invention is not limited as long as it is a process of applying the ink composition onto a recording medium.

The inkjet recording apparatus used in the image forming method according to the invention is not particularly limited, and any known inkjet recording apparatus which is capable of achieving intended resolution can be arbitrarily selected and used. That is, any known inkjet recording apparatuses including commercially available products can perform the ejection of an ink composition onto a recording medium according to the image forming method according to the invention.

Example of the inkjet recording apparatus that can be used in the invention include an apparatus including an ink supplying system, a temperature sensor, and a heating unit.

The ink supplying system includes, for example, a base tank containing the ink composition according to the invention, a supply pipe, an ink supply tank disposed immediately before an inkjet head, a filter, and a piezo type inkjet head. The piezo type inkjet head can be driven so as to discharge a multi-sized dot of preferably from 1 pl to 100 pl, and more preferably from 8 pl to 30 pl, at a resolution of preferably from 320×320 dpi to 4,000×4,000 dpi (dot per inch), more preferably from 400×400 dpi to 1,600×1,600 dpi, and even more preferably 720×720 dpi. The term dpi as used in the invention represents the number of dots per 2.54 cm.

Regarding the ink composition according to the invention, since the temperature of the ink composition to be discharged is preferably constant, it is preferable that the inkjet recording apparatus include a stabilization unit for the ink composition temperature. The part in which a temperature is adjusted to be constant include all of the piping system and members, in the range extending from the ink tank (if an intermediate tank is present, the intermediate tank) to the nozzle injection face. That is, the part extending from the ink supply tank to the inkjet head may be subjected to thermal insulation and heating.

There are no particular restrictions on the method for temperature control, but for example, it is preferable to provide a plural number of temperature sensors at various piping parts to implement control of heating in accordance with the flow rate of the ink composition and the environmental temperature. The temperature sensor can be provided in the vicinity of the ink supply tank and the nozzles of the inkjet head. Furthermore, the head unit to be heated is preferably thermally shielded or insulated so that the main body of the apparatus is not affected by the temperature of external air. In order to shorten the printer boot-up time required for heating, or in order to reduce the loss of heat energy, it is preferable that thermal insulation from other parts is performed, and that the total heat capacity of the heating unit is reduced.

Ejection of the ink composition using the above-described inkjet recording apparatus is preferably carried out, after heating the ink composition preferably to a temperature of from 25° C. to 80° C., and more preferably from 25° C. to 50° C., and thereby lowering the viscosity of the ink composition preferably to 3 mPa·s to 15 mPa·s, and more preferably 3 mPa·s to 13 mPa·s. Particularly, use of an ink composition having a viscosity of 50 mPa·s or less at 25° C. as the ink composition according to the invention is preferable because ejection can be carried out well. By using this method, high ejection stability can be realized.

It is preferable that the temperature of the ink composition at the time of ejection be maintained to be as constant as possible. In the invention, it is appropriate that the range of controling the temperature of the ink composition is preferably ±5° C. of the set temperature, more preferably ±2° C. of the set temperature, and even more preferably ±1° C. of the set temperature.

In the invention, the recording medium is not particularly limited, and any recording medium that is known as a support or a recording material can be used. Examples of the recording medium include paper, paper laminated with a plastic (for example, polyethylene, polypropylene, or polystyrene), a metal plate (for example, aluminum, zinc, or copper), a plastic film (for example, a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, or polyvinyl acetal), and paper or a plastic film on which the aforementioned metal is laminated or deposited. Among them, since the ink composition according to the invention has excellent adhesiveness, the ink composition can be suitably used on a non-absorptive recording medium as the recording medium. From the viewpoint of adhesiveness, plastic base materials such as polyvinyl chloride, polyethylene terephthalate, and polyethylene are preferable, and a polyvinyl chloride resin base material is more preferable, while a polyvinyl chloride resin sheet or film is even more preferable.

<Irradiation Process>

Hereinafter, the irradiation process in the image forming method according to the invention is described. The irradiation process in the invention is not limited as long as it is a process of irradiating the ink composition applied onto a recording medium with an active energy ray. When an active energy ray is irradiated to the ink composition according to the invention, a crosslinking reaction of the compounds in the ink composition proceeds, and an image is fixed, whereby solvent resistance and the like of printed matter can be improved. By the irradiation process, a crosslinking reaction of (Component A) occurs, and a crosslinked structure represented by the following Formula (5) is formed in the ink composition.

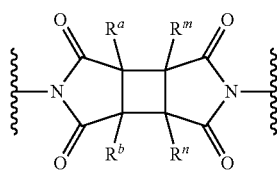

(5)

wherein, in Formula (5), $R^a$, $R^b$, $R^m$ and $R^n$ each independently represent an alkyl group having 1 to 4 carbon atoms; $R^a$ and $R^b$ may be bonded to each other to form a 4-membered to 6-membered ring; and $R^m$ and $R^n$ may be bonded to each other to form a 4-membered to 6-membered ring.

The details of $R^a$ and $R^b$, including preferable examples, are the same as the details of $R^a$ and $R^b$ described in Structural Formula (1). The details of $R^m$, including preferable examples, are the same as the details of $R^a$ described in Structural Formula (1). The details of $R^n$, including preferred examples, are the same as the details of $R^b$ described in Structural Formula (1).

The undulating line in Formula (5) represents the position of bonding in Component A. Hereinafter, the undulating line in Formula (5) has the same definition.

Examples of the active energy ray that can be used in the irradiation process include ultraviolet radiation (hereinafter, also referred to as UV light), visible light, and electron beam. It is preferable to use UV light.

Although the peak wavelength of UV light depends on the absorption characteristics of the sensitizing dye that is optionally used, but for example, the peak wavelength is preferably from 200 nm to 405 nm, more preferably from 250 nm to 405 nm, and even more preferably from 250 nm to 395 nm.

The output power of UV light is preferably 2,000 mJ/cm$^2$ or less, more preferably from 10 mJ/cm$^2$ to 2,000 mJ/cm$^2$, even more preferably from 20 mJ/cm$^2$ to 1,000 mJ/cm$^2$, and particularly preferably from 50 mJ/cm$^2$ to 800 mJ/cm$^2$.

Furthermore, it is adequate to irradiate with UV light at an exposed surface illuminance of, for example, from 10 mW/cm$^2$ to 2,000 mW/cm$^2$, and preferably from 20 mW/cm$^2$ to 1,000 mW/cm$^2$.

As the UV light source, a mercury lamp, a gas/solid laser and the like are mainly used, and a mercury lamp and a metal halide lamp are widely known. Furthermore, replacement with GaN-based semiconductor ultraviolet emitting devices is industrially and environmentally very useful, and LED (UV-LED) and LD (UV-LD) are devices of small size, long service life, high efficiency and low cost, and are expected to be used as UV light sources.

The ink composition according to the invention is irradiated with the UV light suitably for, for example, from 0.01 seconds to 120 seconds, and preferably from 0.1 seconds to 90 seconds.

The irradiation conditions and basic irradiation method are disclosed in JP-A No. 60-132767. Specifically, it is preferable that irradiation is carried out by a system in which light sources are provided on both sides of a head unit including an ink ejecting apparatus, and the head unit and the light sources are scanned in a so-called shuttle manner; or by a system in which irradiation is performed by a separate light source that is not driven. Irradiation of an active energy ray is carried out after a certain time (for example, from 0.01 seconds to 60 seconds, preferably from 0.01 seconds to 30 seconds, and more preferably from 0.01 seconds to 15 seconds) after discharging of the ink and heat fixing.

<Heating and Drying Process>

The ink composition ejected onto a recording medium is preferably fixed by evaporating (Component D) and the water-soluble organic solvent that is optionally used in combination by a heating unit. The process of fixing by applying heat to the ink composition according to the invention that has been ejected is described.

The heating unit may be a unit capable of drying (Component D) and the water-soluble organic solvent that is optionally used in combination, and there are no limitations; however, a heat drum, warm air, an infrared lamp, a heating oven, a heating plate and the like can be used.

The heating temperature is not particularly limited as long as (Component D) that is present in the ink composition and the water-soluble organic solvent that is optionally used in combination can evaporate, and a coating film of (Component A) and a polymer binder that is optionally added can be formed. The effect is obtained at 40° C. or higher, and the heating temperature is preferably from about 40° C. to about 150° C., and more preferably from about 40° C. to about 80° C. When the temperature is higher than 100° C., there is a case in which the recording medium undergo deformation or the like, whereby developing a defect in conveyance.

In addition, the drying/heating time is not particularly limited as long as (Component D) that is present in the ink composition and the water-soluble organic solvent that is optionally used in combination can evaporate, and a coating film of resins can be formed. The drying/heating time can be appropriately set by taking the composition of the ink composition used and the printing speed into consideration.

The solvent type ink composition fixed by heating can be further UV-fixed by irradiating UV light if necessity. It is preferable to perform fixing by UV light in order to improve the strength, water resistance and solvent resistance of the printed matter.

<<Printed Matter>>

The printed matter according to the invention is recorded according to the image forming method according to the invention. Since the printed matter according to the invention is printed matter recorded according to the image forming method according to the invention, printed matter with a recorded image having excellent solvent resistance and adhesiveness to a base material is obtained.

EXAMPLES

Hereinafter, the present invention is specifically described by way of examples, but the invention is not limited to these examples. Unless particularly stated otherwise, the units "part(s)" and "percent (%)" are on a mass basis.

The materials of the pigment dispersions and the ink compositions used in the Examples and Comparative Examples are described below.

<Synthesis of Polymer Dispersant D-1>

In a 500-ml three-necked flask equipped with a stirring machine and a cooling tube, 44 g of methyl ethyl ketone was introduced and heated to 72° C. in a nitrogen atmosphere. A solution prepared by dissolving 0.43 g of dimethyl 2,2'-azobisisobutyrate, 30 g of benzyl methacrylate, 5 g of methacrylic acid, and 15 g of methyl methacrylate in 25 g of methyl ethyl ketone was added dropwise thereto over 3 hours. After completion of the dropwise addition, the mixture was further allowed to react for one hour, and then a solution prepared by dissolving 0.21 g of dimethyl 2,2'-azobisisobutyrate in 1 g of methyl ethyl ketone was added thereto. The temperature of the mixture was increased to 78° C., and the mixture was heated for 4 hours. The reaction solution thus obtained was reprecipitated twice in an excessive amount of hexane, and a resin thus precipitated out was dried, whereby 43 g of a polymer dispersant D-1 was obtained.

The composition of the resin thus obtained was checked by $^1$H-NMR, and the weight average molecular weight (Mw) determined by GPC was 42,000. Furthermore, the acid value determined by the method described in the JIS Standard (JIS K0070:1992) was 65.4 mg KOH/g.

<Preparation of Dispersion of Resin-Coated Pigment>

(Resin-Coated Cyan Pigment Dispersion)

10 parts of Pigment Blue 15:3 (PHTHALOCYANINE BLUE A220, manufactured by Dainichiseika Color Chemicals Manufacturing Co., Ltd.), 5 parts of the polymer dispersant D-1, 42 parts of methyl ethyl ketone, 5.3 parts of a 1 mol/L aqueous NaOH solution, and 87.2 parts of ion-exchanged water were mixed, and dispersed using 0.1-mmφ zirconia beads for 2 to 5 hours by a bead mill.

Methyl ethyl ketone was removed from the dispersion thus obtained, at 55° C. under reduced pressure, and a portion of water was further removed, whereby a dispersion A of a resin-coated cyan pigment (colored particles) with a pigment concentration of 10.2% by mass was obtained.

(Resin-Coated Magenta Pigment Dispersion)

A dispersion B of a resin-coated magenta pigment (colored particles) was obtained in the same manner as described above, except that CHROMOPHTHAL JET MAGENTA DMQ (Pigment Red 122, manufactured by BASF Japan, Ltd.) was used instead of PHTHALOCYANINE BLUE A220 the pigment used in the preparation of the resin-coated cyan pigment dispersion.

(Resin-Coated Yellow Pigment Dispersion)

A dispersion C of a resin-coated yellow pigment (colored particles) was obtained in the same manner as described above, except that IRGALITE YELLOW GS (Pigment Yellow 74, manufactured by BASF Japan, Ltd.) was used instead of PHTHALOCYANINE BLUE A220 the pigment used in the preparation of the resin-coated cyan pigment dispersion.

(Resin-Coated Black Pigment Dispersion)

A dispersion D of a resin-coated black pigment (colored particles) was obtained in the same manner as described above, except that pigment dispersion CAB-O-JET™ 200 (carbon black, manufactured by Cabot Corp.) was used instead of PHTHALOCYANINE BLUE A220 the pigment used in the preparation of the resin-coated cyan pigment dispersion.

<(Component A) Compound Having Two or More Groups Each Represented by Structural Formula (1)>

In regard to (Component A) compound having two or more groups each represented by Structural Formula (1), synthesis was carried out with reference to JP-A No. 52-988.

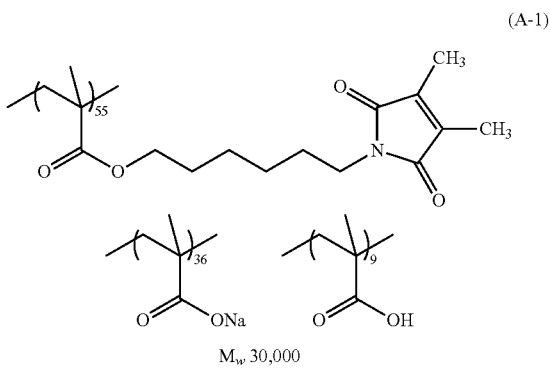

(A-1)

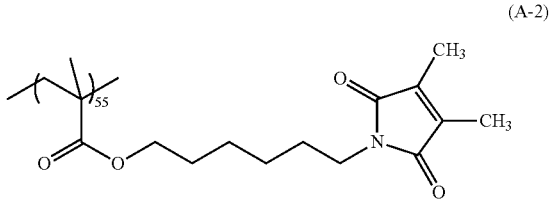

(A-2)

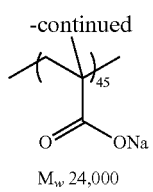

(A-7)

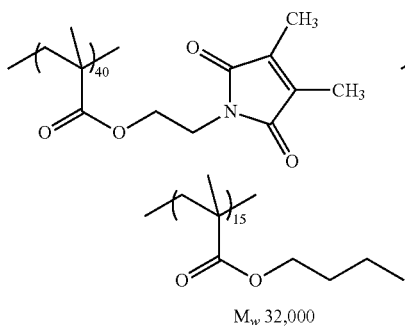

<(Component B) Compound Represented by Formula (2)>

(Component B) compound represented by Formula (2) was synthesized with reference to "The Theory of Photographic Process," edited by T. H. James, 4th Edition, MacMillan Co., New York (1977); "The Cyanine Dyes and Related Compounds," written by F. M. Hamer, John Wiley & Sons Co., New York (1964); JP-A No. 61-203443; and the like.

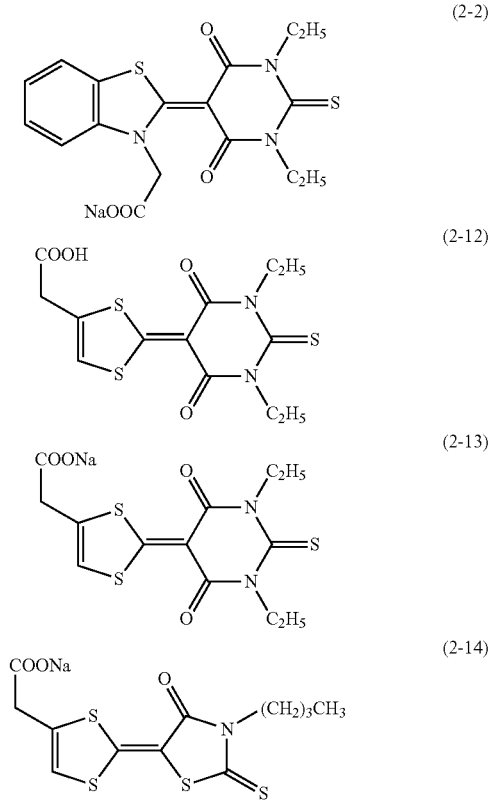

<(Component E) Water-Soluble Organic Solvent>

2-Pyrrolidone (manufactured by Sigma-Aldrich Japan K.K.)

2-Methylpropanediol (manufactured by Sigma-Aldrich Japan K.K.)

Dipropylene glycol monomethyl ether (manufactured by Sigma-Aldrich Japan K.K.)

γ-Butyrolactone (manufactured by Sigma-Aldrich Japan K.K.)

<Polymer Binder>

A-C

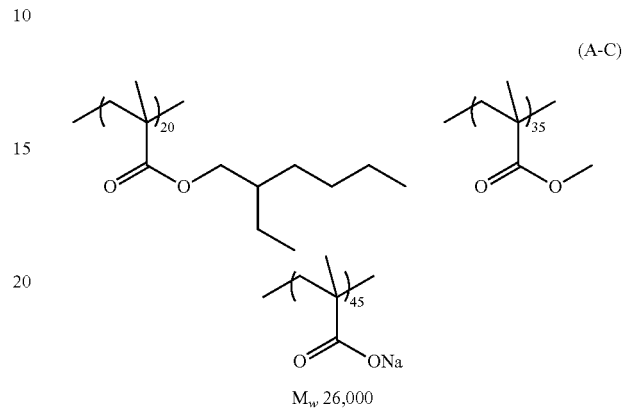

Among the compounds used in the Examples and Comparative Examples, compounds without any indication of the production source were synthesized by a known method or by applying a known method.

Examples 1 to 9 and Comparative Examples 1 to 3

Preparation of Ink Composition

Each of the ink compositions of Examples 1 to 9 and Comparative Examples 1 to 3 having the compositions indicated in the following table was prepared using the obtained color material dispersions A to D, by stirring at 2,500 rotations/minute using a mixer (L4R manufactured by Silverson Machines, Inc.). Each of the ink compositions thus obtained was filled in a plastic disposable syringe and was filtered through a filter made of polyvinylidene fluoride (PVDF) having a pore size of 5 μm (MILLEX-SV manufactured by Millipore, Inc.; diameter: 25 mm) to obtain a finished ink. The respective values of the mixing amounts in the following table represent parts by mass.

The viscosity of the ink composition was measured using VISCOMATE VM-10A-L (manufactured by CMC Materials Co., Ltd.) under a condition of 25° C., and the viscosities of Examples 1 to 9 were from 8 mPa·s to 17 mPa·s.

<Inkjet Image Recording Method>

Next, a commercially available inkjet printer (SP-300V manufactured by Roland DG Corp.) was provided as an inkjet recording apparatus.

Each of the ink compositions thus obtained was loaded in the inkjet printer, and an image was formed on a polyvinyl chloride sheet (manufactured by Avery Dennison Corp., AVERY 400 GLOSS WHITE PERMANENT) to obtain printed matter for the following various evaluations.

Furthermore, irradiation of ultraviolet light was carried out using a light emitting diode (UV-LED, NC4U134 manufactured by Nichia Corp.). The LED is a device outputting ultraviolet light having a wavelength of 365 nm from one chip, and the illuminance at the surface was set to 1,000 mW/cm² by controlling the amount of current (focusing light by using a lens), whereby the exposure time (sec) was adjusted so as to obtain an exposure energy of 700 (mJ/cm$^2$).

The following evaluations were carried out using each of the ink compositions and printed matters thus obtained. The evaluations results are shown in the following table.

<Evaluation of Adhesiveness (Cross Hatching Test)>

As a method for evaluation of adhesiveness to a base material, a cross hatching test (JIS K 5600-5-6) was conducted. According to the above-described inkjet image recording method, a solid image having an average film thickness of 12 μm of the image part was formed.

Thereafter, a cross hatching test was carried out for each of the printed matters. The evaluation was carried out on the basis of a six-grade system from 0 to 5, according to JIS K5600-5-6. Here, grade 0 means that the periphery of the cut is completely smooth, and none of the lattice grids is peeled off Grades up to grade 3 are levels that are practically acceptable.

<Evaluation of Solvent Resistance>

A solid image having an average film thickness of 12 μm was formed according to the inkjet image recording method, and then the surface of each of the printed matters was rubbed with a cotton swab impregnated with a mixed solvent of isopropyl alcohol and 2-butanone (1/1 (volume)), and evaluated on the basis of the following criteria.

A: No change in the image was observed even after rubbing 10 or more times.

B: The optical density of the image was reduced after rubbing 5 to 9 times.

C: The optical density of the image was reduced after rubbing 2 to 4 times.

D: The optical density of the image was notably reduced after rubbing only once.

<Evaluation of Ejectability>

Ejection was carried out for 30 minutes in a standard printing mode using the above-described inkjet printer, and 5 minutes after the end of the ejection, the image (5 cm×5 cm) thus obtained a solid image and a fine line in the standard printing mode on a recording medium (manufactured by Avery Dennison Corp., AVERY 400 GLOSS WHITE PERMANENT) was observed. The observed image was evaluated by visual inspection according to the following evaluation criteria.

A: Occurrence of dot deficiency due to ejection failure or the like was not observed, and an excellent image was obtained.

B: Although occurrence of slight dot deficiency due to ejection failure or the like was observed, the extent of the dot deficiency was practically acceptable.

C: Occurrence of dot deficiency due to ejection failure or the like was observed, and the image was practically intolerable.

D: The ink composition could not be normally ejected.

<Evaluation of Storage Stability of Ink Composition>

Each of the ink compositions thus obtained was sealed in a container, and left to stand for a time period of 4 weeks at 45° C. Thereafter, the same evaluation as the evaluation of ejectability described above was conducted, and the ink compositions were evaluated on the basis of the same criteria.

TABLE 1

|  |  | Example 1 | Example 2 | Example 3 | Example 4 | Example 5 |
|---|---|---|---|---|---|---|
| Component A | A-1 (polymer) | 8 | 8 | — | — | 8 |
|  | A-2 (polymer) | — | — | 8 | 8 | — |
|  | A-7 (polymer) | — | — | — | — | — |
| Component B | 2-2 | 5 | — | — | — | — |
|  | 2-12 | — | 5 | — | — | — |
|  | 2-13 | — | — | 5 | — | — |
|  | 2-14 | — | — | — | 5 | 5 |
| Component C | Pigment dispersion A | 12 | — | — | — | 12 |
|  | Pigment dispersion B | — | 14 | — | — | — |
|  | Pigment dispersion C | — | — | 12 | — | — |
|  | Pigment dispersion D | — | — | — | 12 | — |
| Component D | Distilled water | 48.9 | 47·1 | 48.9 | 48.9 | 48.9 |
| Component E water-soluble organic solvent | 2-Pyrrolidone | 17 | 17 | 17 | 17 | — |
|  | γ-Butyrolactone | — | — | — | — | 17 |
|  | 2-Methylpropanediol | 9 | 9 | 6 | 6 | 6 |
|  | Dipropylene glycol monomethyl ether | — | — | 3 | 3 | 3 |
| Polymer binder | A-C | — | — | — | — | — |
| Sensitizing dye | N-[2-hydroxy-3-(3,4-dimethyl-9-oxo-9H-thioxanthen-2-yloxy)propyl]-N,N,N-trimethylaminium chloride (manufactured by Sigma-Aldrich Co.) | — | — | — | — | — |
| Surfactant | Glide 100 (manufactured by Tego Chemical Service) | 0.1 | — | 0.1 | 0.1 | 0.1 |
| Evaluation | Adhesiveness (after UV-LED irradiation) | 1 | 1 | 0 | 0 | 0 |
|  | Solvent resistance (after UV-LED irradiation) | B | A | A | A | A |
|  | Ejectability | A | A | A | A | A |
|  | Storage stability | A | A | A | A | A |

|  |  | Example 6 | Example 7 | Example 8 | Example 9 |
|---|---|---|---|---|---|
| Component A | A-1 (polymer) | — | — | 7 | — |
|  | A-2 (polymer) | 8 | — | — | 7 |
|  | A-7 (polymer) | — | 8 | — | — |
| Component B | 2-2 | — | — | — | — |
|  | 2-12 | — | — | 5 | — |
|  | 2-13 | 5 | 5 | — | 4 |
|  | 2-14 | — | — | — | — |

TABLE 1-continued

| | | | | | |
|---|---|---|---|---|---|
| Component C | Pigment dispersion A | 12 | 12 | 12 | — |
| | Pigment dispersion B | — | — | — | — |
| | Pigment dispersion C | — | — | — | — |
| | Pigment dispersion D | — | — | — | 12 |
| Component D | Distilled water | 49 | 48.9 | 48.9 | 76.9 |
| Component E water-soluble organic solvent | 2-Pyrrolidone | 17 | 17 | — | — |
| | γ-Butyrolactone | — | — | 18 | — |
| | 2-Methylpropanediol | 9 | 9 | 8 | — |
| | Dipropylene glycol monomethyl ether | — | — | — | — |
| Polymer binder | A-C | — | — | — | — |
| Sensitizing dye | N-[2-hydroxy-3-(3,4-dimethyl-9-oxo-9H-thioxanthen-2-yloxy)propyl]-N,N,N-trimethylaminium chloride (manufactured by Sigma-Aldrich Co.) | — | — | 1 | — |
| Surfactant | Glide 100 (manufactured by Tego Chemical Service) | — | 0.1 | 0.1 | 0.1 |
| Evaluation | Adhesiveness (after UV-LED irradiation) | 1 | 1 | 0 | 3 |
| | Solvent resistance (after UV-LED irradiation) | A | B | A | A |
| | Ejectability | A | A | B | B |
| | Storage stability | A | A | B | B |

| | | Comparative Example 1 | Comparative Example 2 | Comparative Example 3 |
|---|---|---|---|---|
| Component A | A-1 (polymer) | — | 8 | 13 |
| | A-2 (polymer) | — | — | — |
| | A-7 (polymer) | — | — | — |
| Component B | 2-2 | 5 | — | — |
| | 2-12 | — | — | — |
| | 2-13 | — | — | — |
| | 2-14 | — | — | — |
| Component C | Pigment dispersion A | 12 | 12 | 12 |
| | Pigment dispersion B | — | — | — |
| | Pigment dispersion C | — | — | — |
| | Pigment dispersion D | — | — | — |
| Component D | Distilled water | 48.9 | 48.9 | 48.9 |
| Component E water-soluble organic solvent | 2-Pyrrolidone | 17 | 17 | 17 |
| | γ-Butyrolactone | — | — | — |
| | 2-Methylpropanediol | 9 | 9 | 9 |
| | Dipropylene glycol monomethyl ether | — | — | — |
| Polymer binder | A-C | 8 | — | — |
| Sensitizing dye | N-[2-hydroxy-3-(3,4-dimethyl-9-oxo-9H-thioxanthen-2-yloxy)propyl]-N,N,N-trimethylaminium chloride (manufactured by Sigma-Aldrich Co.) | — | 5 | — |
| Surfactant | Glide 100 (manufactured by Tego Chemical Service) | 0.1 | 0.1 | 0.1 |
| Evaluation | Adhesiveness (after UV-LED irradiation) | 4 | 1 | 3 |
| | Solvent resistance (after UV-LED irradiation) | C | B | D |
| | Ejectability | B | C | A |
| | Storage stability | B | D | A |

* "—" means that the substance is not included.

As shown in Table 1, in the Examples according to the invention, excellent effects were obtained in terms of each of adhesiveness, solvent resistance, ejectability and storage stability. On the contrary, in the Comparative Examples, none of the ink compositions produced excellent effects in terms of each of adhesiveness, solvent resistance, ejectability and storage stability.

The entirety of the disclosure of JP 2011-004229 A is incorporated in the present specification by reference.

All publications, patent applications, and technical standards mentioned in this specification are herein incorporated by reference to the same extent as if each individual publication, patent application, or technical standard was specifically and individually indicated to be incorporated by reference.

The invention claimed is:

1. An ink composition, comprising:
(Component A) a compound having two or more groups each represented by the following Structural Formula (1);
(Component B) a compound represented by the following Formula (2);
(Component C) a coloring material; and
(Component D) water:

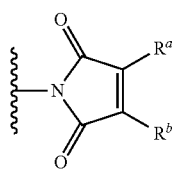

(1)

wherein, in Structural Formula (1), $R^a$ and $R^b$ each independently represent an alkyl group having 1 to 4 carbon atoms, and $R^a$ and $R^b$ may be bonded to each other to form a 4-membered to 6-membered ring; and

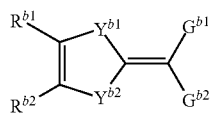

(2)

wherein, in Formula (2), $R^{b1}$ and $R^{b2}$ each independently represent a hydrogen atom, an alkyl group, an aryl group, an alkenyl group, or a residue obtained by eliminating one hydrogen atom from a heterocyclic compound, and $R^{b1}$ and $R^{b2}$ may be bonded to each other to form a ring;

$Y^{b1}$ and $Y^{b2}$ each independently represent a divalent group selected from the group consisting of —O—, —S—, —NR$^{b3}$—, —Se—, —C(CH$_3$)$_2$—, and —CH=CH—, wherein $R^{b3}$ represents a hydrogen atom, an alkyl group, an aryl group, or an alkenyl group;

$G^{b1}$ and $G^{b2}$ each independently represent a hydrogen atom, a cyano group, an amide group, an alkoxycarbonyl group, an aryloxycarbonyl group, an acyl group, an arylcarbonyl group, an alkylsulfanyl group, an arylsulfanyl group, an alkylsulfonyl group, an arylsulfonyl group, or a fluoroalkylsulfonyl group, and $G^{b1}$ and $G^{b2}$ may be bonded to each other to form a ring, provided that when $G^{b1}$ and $G^{b2}$ form a ring, the ring may contain, in the ring, a divalent linking group selected from the group consisting of —C(=O)—, —C(=S)—, —NR$^{12}$—, —N=CR$^{13}$—, —O—, and —S—, wherein $R^{12}$ represents a hydrogen atom, an alkyl group, or an aryl group and $R^{13}$ represents a hydrogen atom, an alkyl group, or an aryl group; and at least one of $R^{b1}$, $R^{b2}$, $Y^{b1}$, $Y^{b2}$, $G^{b1}$ and $G^{b2}$ is substituted with at least one hydrophilic group.

2. The ink composition according to claim 1, wherein the compound represented by Formula (2) is a compound represented by the following Formula (2-a):

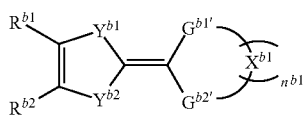

(2-a)

wherein, in Formula (2-a), $G^{b1'}$ and $G^{b2'}$ each represent a residue obtained by eliminating one hydrogen atom from $G^{b1}$ and $G^{b2}$ in Formula (2); $X^{b1}$ represents a single bond, —C(=O)—, —C(=S)—, —NR$^{12}$—, —N=CR$^{13}$—, —O—, or —S—, wherein $R^{12}$ represents a hydrogen atom, an alkyl group, or an aryl group and $R^{13}$ represents a hydrogen atom, an alkyl group, or an aryl group, while a plurality of $X^{b1}$'s may be identical to or different from each other; and $n^{b1}$ represents an integer of 1 or greater;

$R^{b1}$ and $R^{b2}$ each independently represent a hydrogen atom, an alkyl group, an aryl group, an alkenyl group, or a residue obtained by eliminating one hydrogen atom from a heterocyclic compound, and $R^{b1}$ and $R^{b2}$ may be bonded to each other to form a ring; and $Y^{b1}$ and $Y^{b2}$ each independently represent —O—, —S—, or —NR$^{b3}$—, wherein $R^{b3}$ represents a hydrogen atom, an alkyl group, an aryl group, or an alkenyl group; and at least one of $R^{b1}$, $R^{b2}$, $Y^{b1}$, $Y^{b2}$, $G^{b1'}$, $G^{b2'}$ and $X^{b1}$ is substituted with at least one hydrophilic group.

3. The ink composition according to claim 1, wherein the compound represented by Formula (2) is a compound represented by the following Formula (2-b):

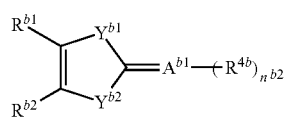

(2-b)

wherein, in Formula (2-b), $A^{b1}$ represents a residue obtained by eliminating (2+$n^{b2}$) hydrogen atoms from a compound having a hydrocarbon ring or a compound having a heterocyclic ring; $R^{4b}$ represents a hydrogen atom, an alkyl group, or an aryl group, and when there are plural $R^{4b}$'s, each $R^{4b}$ may be identical to or different from another $R^{4b}$); $n^{b2}$ represents an integer of 0 or greater, provided that the double bond linking $A^{b1}$ and the 5-membered ring in Formula (2-b) is bonded to a carbon atom in $A^{b1}$; and at least one of $R^{b1}$, $R^{b2}$, $Y^{b1}$, $A^{b1}$, and $R^{4b}$ is substituted with at least one hydrophilic group.

4. The ink composition according to claim 1, wherein the compound represented by Formula (2) is a compound represented by the following Formula (2-c):

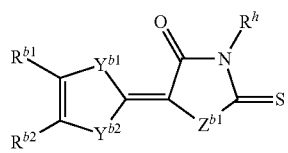

(2-c)

wherein, in Formula (2-c), $Z^{b1}$ represents —CONR$^i$—, —NR$^i$—, —O—, or —S—; $R^i$ represents a hydrogen atom, an alkyl group, or an aryl group; $R^h$ represents a hydrogen atom, an alkyl group, or an aryl group; $R^{b1}$ and $R^{b2}$ each independently represent a hydrogen atom, an alkyl group, an aryl group, an alkenyl group, or a residue obtained by eliminating one hydrogen atom from a heterocyclic compound, and $R^{b1}$ and $R^{b2}$ may be bonded to each other to form a ring; $Y^{b1}$ and $Y^{b2}$ each independently represent —O—, —S—, or —NR$^{b3}$—, wherein $R^{b3}$ represents a hydrogen atom, an alkyl group, an aryl group, or an alkenyl group; and at least one of $R^{b1}$, $R^{b2}$, $Y^{b1}$, $Y^{b2}$, $Z^{b1}$, and $R^h$ is substituted with at least one hydrophilic group.

5. The ink composition according to claim 1, wherein the hydrophilic group is at least one group selected from the group consisting of —COOH, —NHSO$_2$R$^4$, —CONHCOR$^4$, and —$CONHSO_2R^4$, wherein $R^4$ represents an alkyl group, an aryl group, or an aralkyl group, or a salt thereof.

6. The ink composition according to claim 1, wherein the (Component A) compound having two or more groups represented by Structural Formula (1) is a polymer compound having a group represented by Structural Formula (1) in a side chain thereof.

7. The ink composition according to claim 6, wherein a weight average molecular weight of the polymer compound having a group represented by Structural Formula (1) in a side chain thereof is 5,000 to 200,000.

8. The ink composition according to claim 1, wherein a content of the (Component D) water in the ink composition is from 10% to 97% by mass.

9. The ink composition according to claim 1, further comprising (Component E) a water-soluble organic solvent.

10. An image forming method comprising:
    applying the ink composition according to claim 1 onto a recording medium; and
    irradiating the ink composition with an active energy ray.

11. Printed matter recorded by the image forming method according to claim 10.

\* \* \* \* \*